United States Patent [19]
Machino et al.

[11] Patent Number: 5,315,746
[45] Date of Patent: May 31, 1994

[54] ELASTIC RING MOUNTING METHOD

[75] Inventors: Masaki Machino; Shojiro Danmoto, both of Ushiku, Japan

[73] Assignee: Canon Kabushiki Kaisha, Tokyo, Japan

[21] Appl. No.: 127,472

[22] Filed: Sep. 28, 1993

Related U.S. Application Data

[63] Continuation of Ser. No. 47,012, Apr. 14, 1993, abandoned, which is a continuation of Ser. No. 676,530, Mar. 28, 1991, abandoned.

[30] Foreign Application Priority Data

| Mar. 29, 1990 [JP] | Japan | 2-78691 |
| Mar. 29, 1990 [JP] | Japan | 2-78692 |
| Mar. 29, 1990 [JP] | Japan | 2-78693 |
| Mar. 29, 1990 [JP] | Japan | 2-78696 |
| Mar. 20, 1991 [JP] | Japan | 3-080438 |
| Mar. 20, 1991 [JP] | Japan | 3-080593 |

[51] Int. Cl.$^5$ .................. B23P 11/02; B23P 19/04
[52] U.S. Cl. ........................ 29/451; 29/450; 29/453; 29/229
[58] Field of Search ............ 29/450, 451, 453, 464, 29/468, 229, 809

[56] References Cited

U.S. PATENT DOCUMENTS

| 2,840,892 | 7/1958 | Erdmann | 29/229 |
| 3,483,606 | 12/1969 | Ethridge et al. | 29/229 |
| 4,004,338 | 1/1977 | Breitbach | 29/229 |
| 4,532,706 | 8/1985 | Horn | 29/453 |
| 4,550,485 | 11/1985 | Killian | 29/450 |
| 5,072,505 | 12/1991 | Liechty | 29/453 |

FOREIGN PATENT DOCUMENTS

| 211228 | 7/1984 | Fed. Rep. of Germany | 29/229 |
| 218294 | 2/1985 | Fed. Rep. of Germany | 29/229 |
| 218581 | 2/1985 | Fed. Rep. of Germany | 29/229 |
| 60-197324 | 10/1985 | Japan . | |
| 1-58435 | 3/1989 | Japan | 29/464 |

Primary Examiner—Mark Rosenbaum
Assistant Examiner—David P. Bryant
Attorney, Agent, or Firm—Fitzpatrick, Cella, Harper & Scinto

[57] ABSTRACT

A method for inserting an elastic ring having a peripheral opening within a workpiece. The elastic ring is first supplied to a ring receiving member, which then delivers the ring receiving member to an operating position. At the operating position, the diameter of the elastic ring is reduced by engaging portions on the ring receiving member. The diametrically reduced ring is then transferred to a finger member, which holds the ring in its reduced state and inserts the ring within the workpiece. The elastic ring is then released from the finger member and allowed to naturally expand within the workpiece.

5 Claims, 35 Drawing Sheets

ELASTIC RING MOUNTING METHOD

This application is a continuation of application Ser. No. 08/047,012, filed Apr. 14, 1993, which is a continuation of application Ser. No. 07/676,530, filed Mar. 28, 1991, both now abandoned.

BACKGROUND OF THE INVENTION

2. Field of the Invention

The present invention relates to an elastic ring mounting method and apparatus, using a separating and supplying device.

2. Related Background Art

Conventional separating and supplying devices for an elastic ring mounting apparatus are divided into the following two groups (1) and (2):

(1) A lowermost C-ring is separated from a bottom of a stocker in which a plurality of C-rings are arranged and stacked by means of a protruding plate slidably guided by a guide under the driving of a cylinder, and after two pins of an opening/closing pawl are inserted into two corresponding holes in said separated C-ring, a diameter of the C-ring is reduced by closing the opening/closing pawls, thus picking up the C-ring (see Japanese Patent Laid-open No. 60-197324, right column of page 1); and (2) A lowermost C-ring is separated from a bottom of a stocker in which a plurality of C-rings are arranged with respect to same direction and stacked, by means of a protruding plate slidably guided by a guide under the driving of a cylinder, and a diameter of the C-ring is reduced by sliding said separated C-ring along a tapered portion by means of a conveying cylinder (charging cylinder), thus picking up the C-ring (see the aforementioned Japanese Patent Laid-Open No. 60-197324, right lower column of page 2 — left upper column of page 3).

In the above conventional separating and supplying device for the C-ring mounting apparatus of the above type (1), since the C-ring is not fixedly supported, when the two pins are inserted into the two holes of the C-ring, the C-ring would be out of position, thus making it difficult to insert the pins into the holes.

On the other hand, in the above-conventional separating and supplying device for the C-ring mounting apparatus of the above type (2), since the C-ring is slid along the tapered portion to reduce the diameter thereof, it is required to use the large-sized conveying cylinder (charging cylinder), thus making the whole apparatus bulky.

SUMMARY OF THE INVENTION

The present invention aims to eliminate the above-mentioned conventional drawbacks, and it is an object of the present invention to provide a method and apparatus for mounting an elastic ring on a work, which permits easy insertion of two pins of a finger means into two holes of a C-ring and permits the use of a small-sized charging drive means.

Another object of the present invention is to provide an apparatus for inserting an elastic ring supplied from a stocker onto a work by compressing the elastic ring, which can improve the ability for compressing, feeding and mounting the elastic ring.

In connection with these objects, the present invention provides means for keeping the posture of the elastic ring in a stable condition during the compression of the elastic ring, in consideration of the case where the elastic ring cannot be compressed smoothly due to the repelling power of the elastic ring in a compressing direction.

A further object of the present invention is to provide a method for inspecting a mounting condition of a C-ring which can automatically and accurately inspect an engagement condition of the C-ring mounted in a C-ring receiving groove formed in an inner surface of a work.

In the method for inspecting the mounting condition of the C-ring according to the present invention, a probe having a plurality of contact pieces equally spaced in a circumferential direction and the contact pieces having lower surfaces positioned in the same horizontal plane is inserted into the inner surface of the work within which the C-ring is mounted; when at least one of the contact pieces come into contact with a surface of the C-ring, a height of the contact piece contacted is detected; the detected height is compared with a predetermined height reference value and judged whether the compared value falls within a predetermined range or not, thereby inspecting the engagement condition of the C-ring mounted in the C-ring receiving groove in the inner surface of the work.

BRIEF DESCRIPTION OF THE DRAWINGS

FIG. 11 is a perspective view of the mounting apparatus,

FIG. 12 is an explanatory view for explaining an inspecting method, and

FIG. 13 is a control block diagram of the apparatus of FIG. 11;

FIG. 19 shows a separating process of the ring mounting method, where

FIG. 20 shows a front part process of the ring mounting method, where

FIG. 23 shows a rear part process of the ring mounting method, where

FIG. 25 shows a front part process of the ring mounting method, where

DETAILED DESCRIPTION OF THE PREFERRED EMBODIMENTS

The present invention will now be explained in connection with embodiments thereof with reference to the accompanying drawings.

Figure 1:
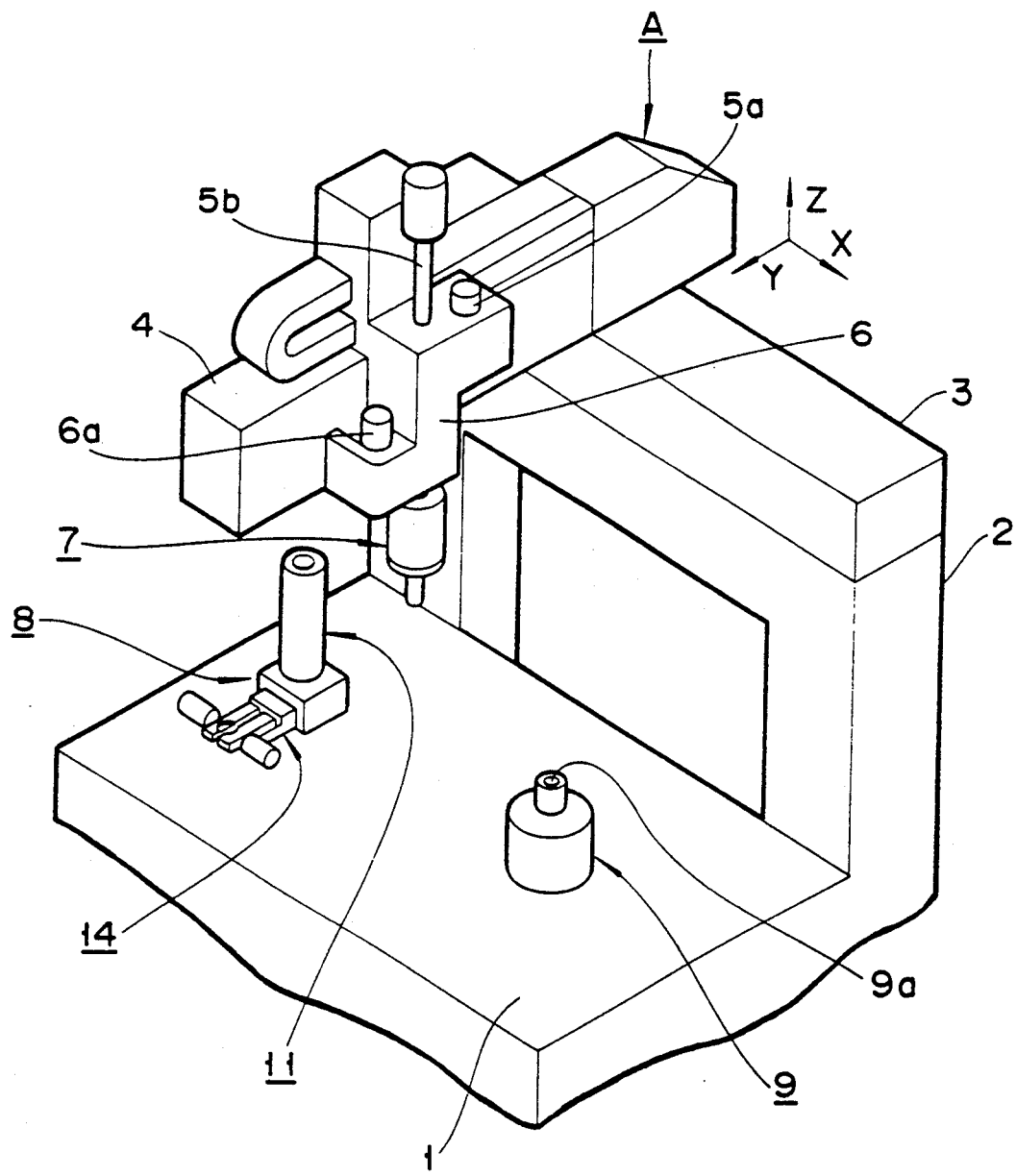
FIG. 1 is a perspective view of an elastic ring mounting apparatus with a separating and supplying device, according to a first embodiment of the present invention.

First of all, a C-ring mounting apparatus incorporating a separating and supplying device, according to a first embodiment will be explained with reference to FIG. 1.

The reference numeral A denotes a Cartesian coordinates robot constituting a feeding means, which comprises an X-axis arm 3 fixed to a column 2 of a base 1 and extending in an X direction, a Y-axis arm 4 supported by the X-axis arm 3 for movement in the X direction and reciprocally shifted in the X direction by means of an X-axis drive means (not shown), and a Z-axis arm attachment member 6 supported by the Y-axis arm 4 for movement in a Y direction and reciprocally shifted in the Y direction by means of a Y-axis drive means (not shown).

The Z-axis arm attachment member 6 rotatably supports a Z-axis arm 5b extending in a Z direction, which arm 5b is reciprocally shifted in the Z direction by means of a conventional ball/screw mechanism driven by a motor 5a.

On the other hand, a finger means 7 is rotatably mounted on a lower end of the Z-axis arm 5b and is provided with a conventional transmitting mechanism driven by a motor 6a wherein a rotational force is transmitted regardless of a shifted position thereof in the Z direction. By energizing the motor 6a, the finger means 7 is rotated in a circumferential direction to be oriented toward a desired direction.

A separating and supplying device 8 mounted on a base 1 comprises a supply means 11 for storing a plurality of C-rings (not shown), and a separating charge means 14 for receiving one C-ring separated from the supply means 11 and for charging the received C-ring. Further, a two-stepped cylindrical work (article) 9 having an insertion hole 9a and a C-ring receiving groove (not shown) is also mounted on the base 1.

Next, various parts and means of the C-ring mounting apparatus will be fully explained with reference to FIG. 2, FIG. 3A, FIG. 3B, FIG. 3C and FIG. 4A.

Figure 2:
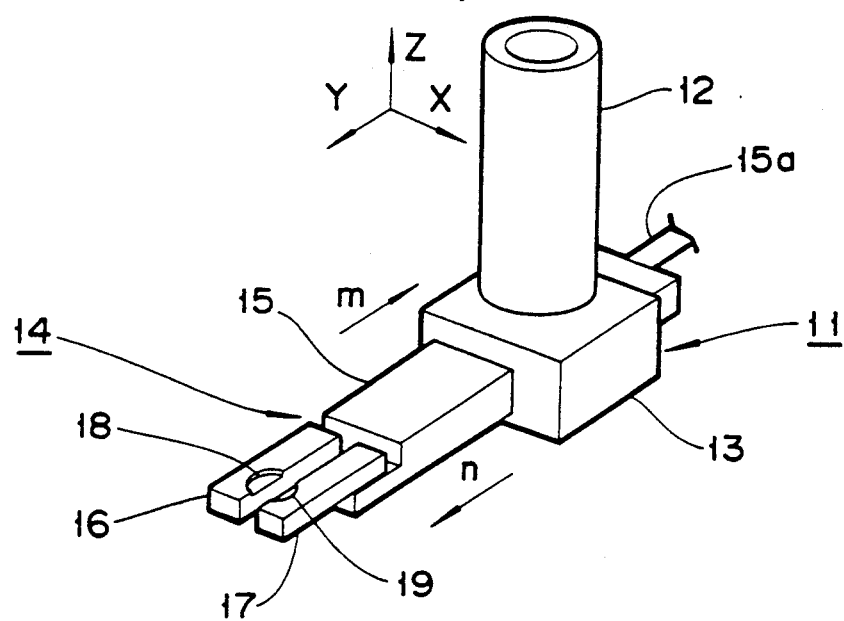
FIG. 2 is an enlarged perspective view of the separating and supplying device of FIG. 1.

As shown in FIG. 2, the supply means 11 of the separating and supplying device 8 (refer to FIG. 1) comprises a magazine 12 for storing a plurality of C-rings (not shown) oriented in the same direction and stacked vertically, and a body 13 supporting a lower end of the magazine 12 and communicated with a lower end of a supply opening of the magazine 12. On the other hand, an escape portion 15 forming a part of the separating charge means 14 extends through the body 13, and a rod 15a of a cylinder (not shown) is fixed at its one end. Thus, the escape portion 15 can be reciprocally shifted in the Y direction by means of the cylinder.

Figure 3A:
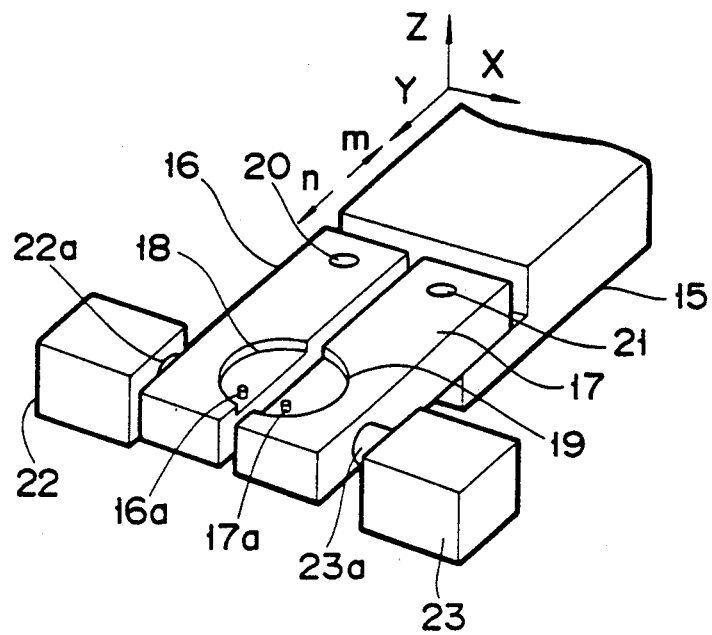
FIG. 3A is an enlarged perspective view of a portion of the device of FIG. 2.
Figure 3B:
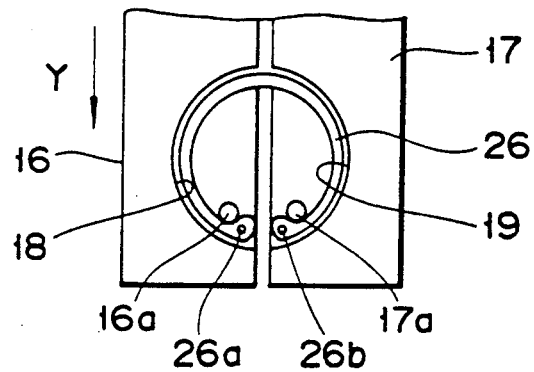
FIG. 3B is an enlarged plan view of a portion of FIG. 3A.

As shown in FIG. 3A and FIG. 3B, a pair of opening/closing arms 16, 17 are pivotally mounted on au upper surface of a front part of the escape portion 15 so as to pivot round pins 20, 21, respectively. A compression spring 15b (FIG. 3C) is disposed between opposed side surfaces of the opening/closing arms 16, 17, thus always biasing the arms 16, 17 toward an open position. Upper surfaces of the opening/ closing arms 16, 17 are flush with an upper surface of the escape portion 15, and semi-circular recesses 18, 19 each for receiving a half portion of the C-ring 26 having a free diameter are formed in upper surfaces of the opening/closing arms 16, 17 at their front parts, respectively. A depth of each recess 18, 19 substantially equals a thickness of the C-ring 26. A circumference of the C-ring received in the recesses 18, 19 is regulated by inner surfaces of the recesses 18, 19. Further, the opening/closing arms 16, 17 are provided with projections 16a, 17a, respectively, which are integrally formed on the arms and disposed within the corresponding recesses 18, 19. The positions of the paired projections 16a, 17a are selected so that they can prevent the C-ring 26 from shifting in the circumferential direction. These projections 16a, 17a are engaged with free ends of the C-ring 26, respectively, and act as a position regulating means for the C-ring. With the arrangement as mentioned above, as the escape portion 15 is reciprocally shifted in the Y direction by means of the cylinder (not shown), when the recesses 18, 19 are positioned below the C-rings stacked in the magazine 12, a lowermost C-ring is dropped down by its own weight to be received in the recesses 18, 19 so that the free ends of the C-ring are engaged by the paired projections 16a, 17a. Thereafter, by returning the escape portion 15 to the original position, the C-ring 26 can be separated from the other C-rings.

A pair of cylinders 22, 23 acting as a drive means for charging the C-ring 26 and having rods 22a, 23a are fixedly mounted on the base 1 in such a manner that free ends of the rods 22a, 23a are opposed to outer side surfaces of front parts of the paired opening/ closing arms 16, 17. When the paired arms 16, 17 containing the C-ring 26 are returned to the original position together with the escape portion 15, the cylinders 22, 23 are operated synchronously with each other so that both rods 22a, 23a are extended to rotate the opening/closing arms 16, 17 slightly until the front ends of the arms 16, 17 are abutted against each other. In this way, the C-ring 26 received in the recesses 18, 19 is charged.

Figure 3C:
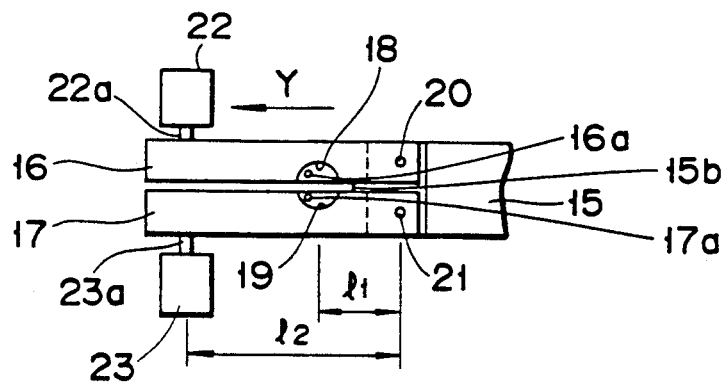
FIG. 3C is a plan view showing a modification for the device of FIGS. 3A and 3B.

Further, as shown in FIG. 3C, when a distance $\lambda_2$ between the pins 20, 21 and acting points of the rods 22a, 23a to the arms 16, 17 (i.e., contacting points between the rods and the arms) is sufficiently longer than a distance $\lambda_1$ between the pins 20, 21 and the recesses 18, 19, it is possible to utilize small-sized cylinders 22, 23, since smaller forces of the rods 22a, 23a are required for rocking the arms 16, 17, on charging of the C-ring 26.

Figure 4A:
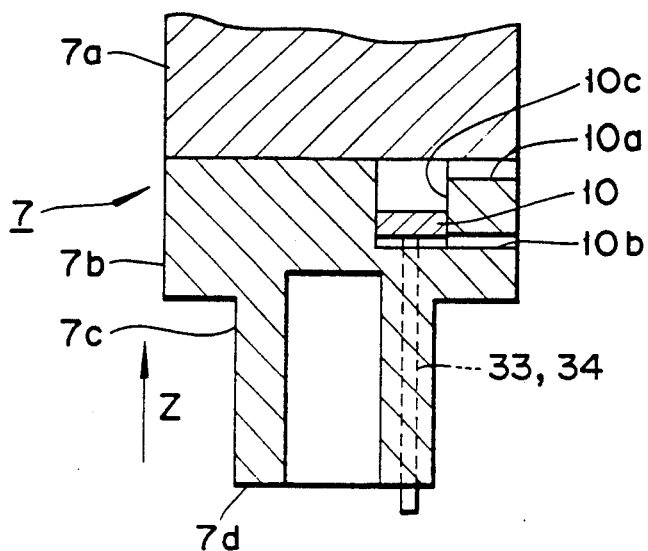
FIG. 4A is an enlarged elevational sectional view of a finger means of the apparatus of FIG. 1.
Figure 4B:
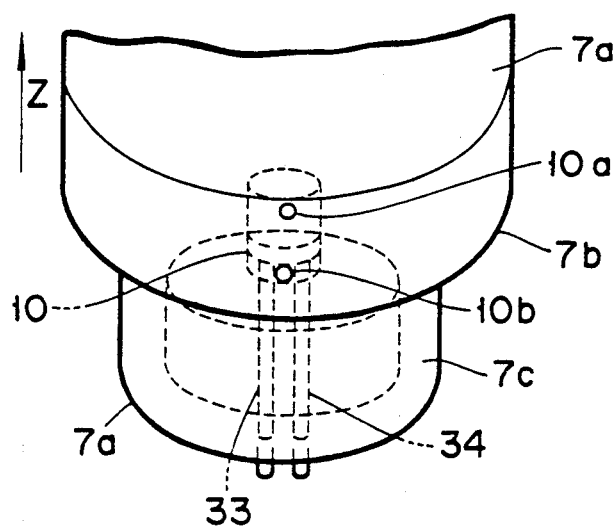
FIG. 4B is an enlarged perspective view of a portion of the finger means.
Figure 5A:
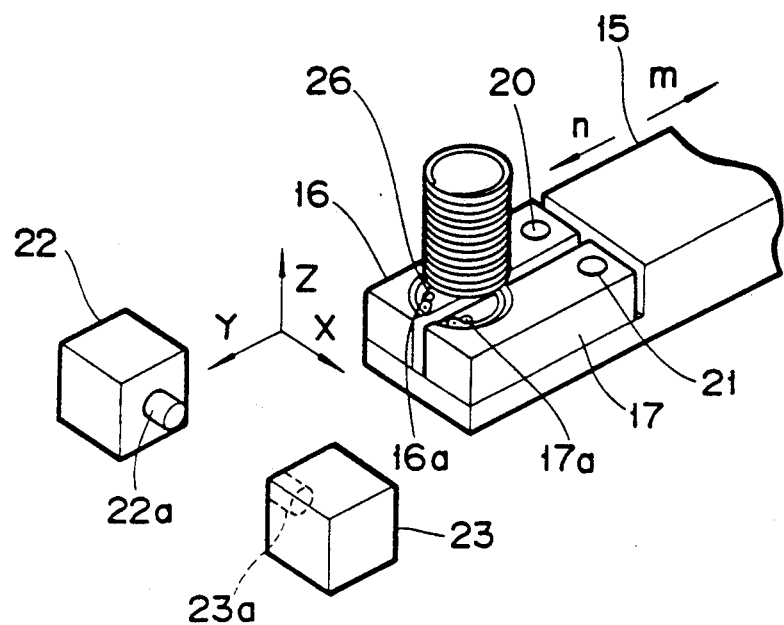
FIGS. 5A to 5F are perspective views of parts of the apparatus, for explaining the process for mounting a ring in a work, in the first embodiment.
Figure 5B:
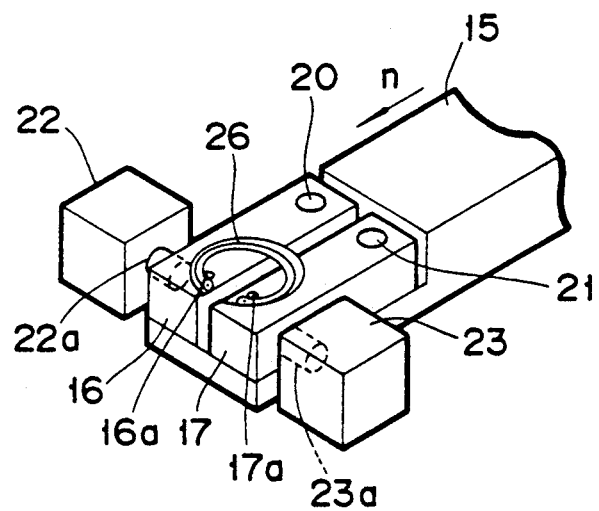
Figure 5C:
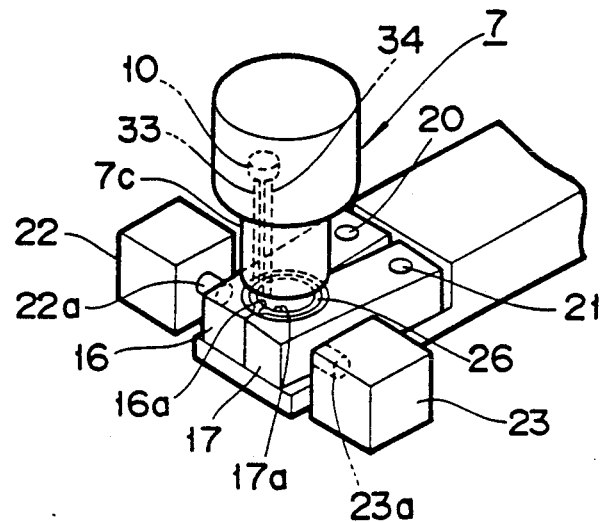
Figure 5D:
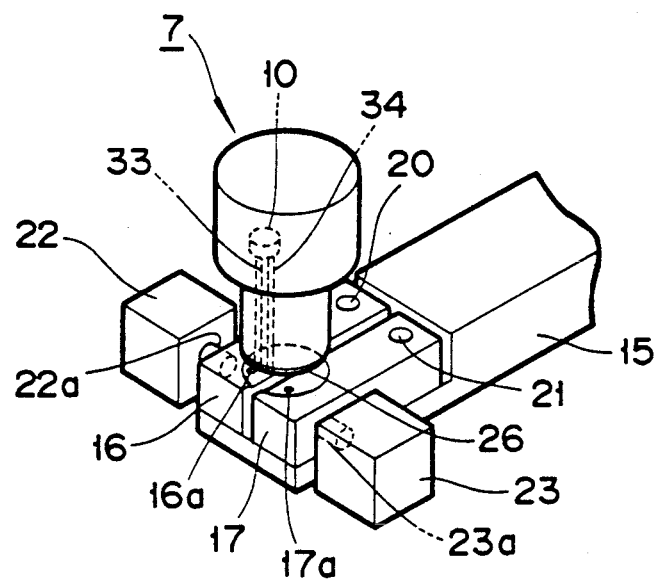
Figure 5E:
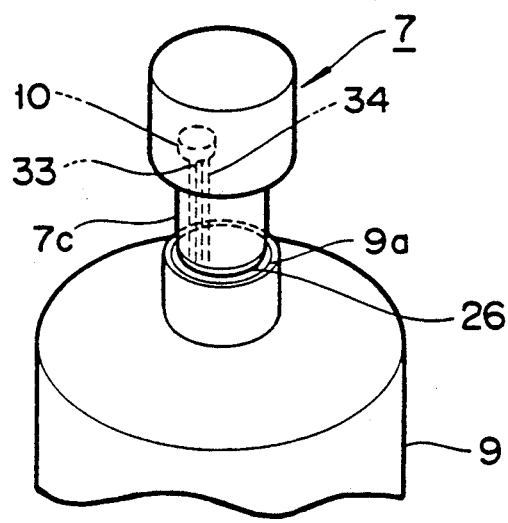
Figure 5F:
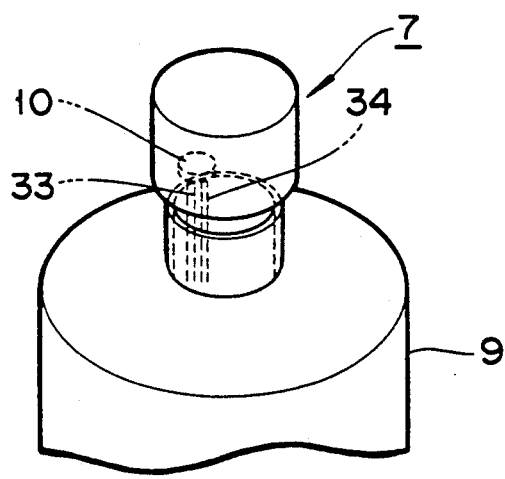
Figure 6A:
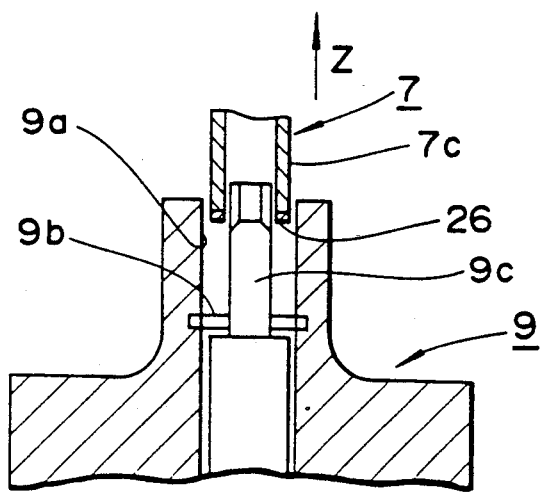
FIGS. 6A is an elevational sectional view corresponding to FIG. 5E.
Figure 6B:
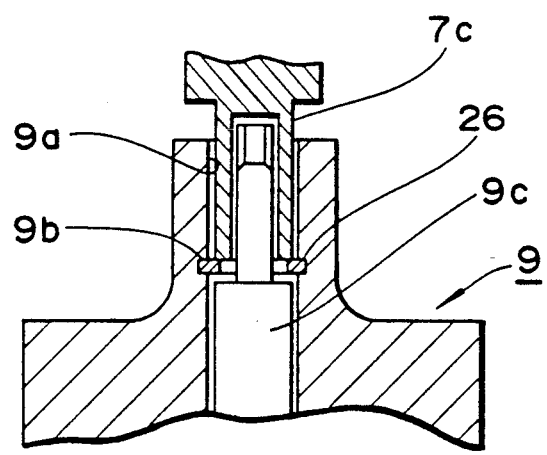
FIGS. 6B is an elevational sectional view corresponding to FIG. 5F.

As shown in FIG. 4A and FIG. 4B, the finger means 7 includes a cylindrical body 7a rotatably supported on the lower end of the Z-axis arm 5b (see FIG. 1), and a two-stepped cylindrical lower member 7b fixed to the body 7a. A lower portion of the lower member 7b is formed as an annular insertion portion 7c. An outer diameter of the insertion portion 7c is slightly smaller than a diameter of the insertion opening 9a of the work 9 shown in FIG. 6A and FIG. 6B and is substantially the same as an outer diameter of the charged C-ring 26. An inner diameter of the insertion portion 7c is slightly greater than a threaded portion of a shaft 9c of the work 9. Within the lower member 7b, a cylindrical bore defining a cylinder chamber 10c, and two pressurized fluid passages 10a, 10b communicated with upper and lower ends of the cylinder chamber 10c are formed. A piston 10 is slidably received in the cylinder chamber 10c and is connected, at its lower surface, to upper ends of two pins 33, 34. These pins 33, 34 slidably extend through the insertion portion 7c in the Z direction, and a diameter of each pin 33, 34 is slightly smaller than those of holes 26a, 26b formed in the C-ring 26a, 26b (refer to FIG. 3B). Further, a distance between the two pins 33, 34 is selected to be the same as a distance between the holes 26a, 26b of the C-ring 26 which is charged. With this arrangement, when the pressurized fluid is introduced into the cylinder chamber 10c through one of the pressurized fluid passages 10a, the piston 10 is shifted downwardly to push the pins 33, 34 down, thus protruding the lower ends of these pins 33, 34 from the lower surface 7d of the insertion portion 7c by a height corresponding to the thickness of the C-ring 26. On the other hand, when the pressurized fluid is introduced into the cylinder chamber 10c through the other passage 10b, the pins 33, 34 are retracted within the lower member 7b completely.

The above-mentioned Cartesian coordinates robot A includes a controller (not shown) for controlling the activation of the aforementioned X-axis drive means, Y-axis drive means and two motors 5a, 6a, on the basis of an inputted program.

By inputting to the controller a program wherein a first position shifting amount of the finger means 7 from the original position to the separating charge means 14, a second position shifting amount of the finger means 7 from the separating charge means 14 to the work 9, and a third position shifting amount of the finger means 7 from the insertion position regarding the work 9 to the C-ring receiving recess are previously set, the Cartesian coordinates robot is operated. In this case, since the controller controls the activation of the X-axis drive means, Y-axis drive means and motor 5a of the Cartesian coordinates robot A, the finger means 7 is automatically shifted in the triaxial directions. That is to say, the finger means 7 previously positioned in the original position is automatically shifted to the separating charge means 14, and then is automatically shifted directly above the insertion opening 9a of the work 9 (i.e., the insertion position) and is positioned there. Thereafter, the finger means 7 is further shifted so that the C-ring held by the finger means 7 is received in the C-ring receiving groove of the work 9.

Next, an operation of the apparatus according to this embodiment will be explained with reference to FIGS. 5A to FIG. 5F, and FIG. 6A and 6B.

First of all, to the controller is inputted the program wherein the first position shifting amount of the finger means 7 from the original position to the separating charge means 14, the second position shifting amount of the finger means 7 from the separating charge means 14 to the insertion position regarding the work 9, and the third position shifting amount of the finger means 7 from the insertion position regarding the work 9 to the C-ring receiving recess 9b are set.

When the recesses 18, 19 of the paired opening/ closing arms 16, 17 are shifted below the stacked C-rings by shifting the escape portion 15 from a position shown in FIG. 2 to a direction shown by the arrow m (this shifting movement of the escape portion is referred to as "retract" hereinafter) by means of a cylinder (not shown), a lowermost C-ring is dropped down by its own weight to be received into the recesses 18, 19. In this case, the free ends of the C-ring are engaged by the projections 16a, 17a, respectively, thus preventing the C-ring 26 from shifting in the circumferential direction (refer to FIG. 5A). Then, the escape portion 15 is shifted in a direction shown by the arrow n (this shifting movement of the escape portion is referred to as "advance" hereinafter) to be returned to the original position (refer to FIG. 5B). At this point, the pair of cylinders 22, 23 are activated synchronously with each other to extend the respective rods 22a, 23a, with the result that the pair of opening/closing arms 16, 17 are closed, whereby the C-ring 26 is charged by being compressed in a radial direction by the inner surfaces of the recesses 18, 19. Thereafter, the free ends of the pins 33, 34 of the finger means 7 protrude from the lower surface 7d of the insertion portion 7c by the height corresponding to the thickness of the C-ring 26. When the Cartesian coordinates robot A is operated, it shifts the finger means 7 previously positioned at the original position in the triaxial directions by the first position shifting amount on the basis of the command from the controller (refer to FIG. 5C), with the result that the two pins 33, 34 are inserted into the holes 26a, 26b (FIG. 3B) of the C-ring 26 charged by the paired opening/closing arms 16, 17, respectively, and at the same time the lower surface 7d of the inserted portion 7c is abutted against the upper surface of the C-ring 26. Then, when the pair of cylinders 22, 23 are driven synchronously with each other to retract the respective rods 22a, 23a, the C-ring 26 is supported by the two pins 33, 34 by its own repelling force. The Cartesian coordinates robot A shifts the finger means 7 in the triaxial directions by the second position shifting amount (refer to FIG. 5D), with the result that the C-ring 26 held by the pins 33, 34 and the insertion portion 7c is positioned directly above the insertion opening 9a of the work 9 (i.e., insertion position). Then, by shifting the finger means 7 downwardly by the third position shifting amount, the insertion portion 7c and the C-ring 26 are inserted into the insertion opening 9a of the work 9 (refer to FIGS. 5E and 6A), whereby the C-ring 26 is positioned in the C-ring receiving recess 9b. In this case, since the insertion portion 7c has an annular configuration, it does not interfere with the shaft 9c of the work 9. Then, when the two pins 33, 34 are completely retracted within the insertion portion 7c by introducing the pressurized fluid into the cylinder chamber 10c via the pressurized fluid passage 10b, the diameter of C-ring 26 is increased by its repelling force, whereby the C-ring is fitted in the C-ring receiving recess 9b (refer to FIGS. 5F and 6B). Thereafter, the finger means 7 is returned to the original position by the Cartesian coordinates robot A, and, then the work is replaced by a new one, and, thereafter, the above-mentioned operation or sequence is automatically repeated. In this way, the C-rings can be mounted on the works successively.

In the illustrated embodiment, while an example that the piston slidably received in the cylinder chamber acts as the drive means for the two pins 33, 34 was explained, the drive means is not limited to this example, but, the two pins may be driven by two discrete pistons slidably received in respective cylinders and activated in synch with each other. Further, in place of the piston and the cylinder chamber, an electrical drive means such as a solenoid can be utilized.

Next, a second embodiment of the present invention will be explained.

Figure 7:
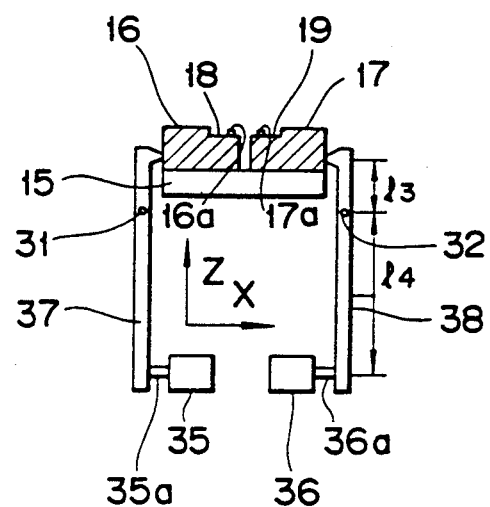
FIG. 7 is a sectional end view of a separating charge means of an elastic ring mounting apparatus according to a second embodiment of the present invention.

As shown in FIG. 7, a cavity is formed in a base (not shown), and a pair of cylinders 35, 36 constituting the separating charge means are housed in the cavity. The cylinders 35, 36 are mounted on the base in such a manner that bottom walls of the cylinders are opposed to each other. Further, a pair of levers 37, 38 are pivotally mounted on the base near upper ends thereof so as to pivot round pins 31, 32, and most of the levers 37, 38 is housed in the cavity. Rods 35a, 36a of the paired cylinders 35, 36 are connected to lower ends of the paired levers 37, 38. On the other hand, the upper ends (free ends) of the paired levers 37, 38 are abutted against the outer side surfaces of the front parts of the paired opening/closing arms 16, 17 having the projections 16a, 17a acting as the position regulating means. The above-mentioned pairs of cylinders 35, 36, rods 35a, 36a and levers 37, 38 constitute the drive means for charging the C-ring. Other constructions or arrangements of the second embodiment are the same as those of the first embodiment.

In the second embodiment, when the escape portion 15 is advanced to the original position (i.e., charging position) after the C-ring is received in the recesses 18, 19, the pair of cylinders 35, 36 are driven synchronously with each other to extend the respective rods 35a, 36a, thereby rocking the paired levers 37, 38 slightly. Consequently, the paired opening/closing arms 16, 17 are closed, thus charging the C-ring.

Incidentally, when a distance $\lambda_4$ between the pins 31, 32 and acting points of the rods 35a, 36a to the levers 37, 38 is sufficiently longer than a distance $\lambda_3$ between the pins 31, 32 and the free ends of the levers 37, 38, as the C-ring 26 is charged, it is possible to utilize small-sized cylinders 35, 36 since smaller forces of the rods 35a, 36a are required for rocking the levers 37, 38.

Next, a third embodiment of the present invention will be explained.

Figure 8:
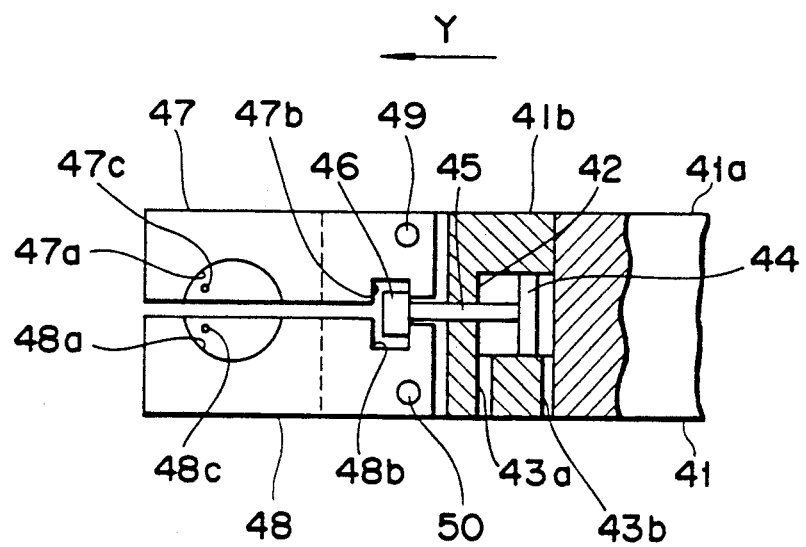
FIG. 8 is a plan view, in partial section, of a separating charge means of an elastic ring mounting apparatus according to a third embodiment of the present invention.

As shown in FIG. 8, an escape portion 41 of the separating charge means has a body 41a, and a two-stepped plate-shaped end portion 41b. A cylinder chamber 42 similar to that shown in FIGS. 4A and 4B, and two pressurized fluid passages 43a, 43b communicated with upper and lower ends of the cylinder chamber 42 are formed in the end portion 41b. A piston 44 is slidably received in the cylinder chamber 42. The piston 44 has a rod 45 protruding from a front or left end surface of the escape portion 41, and a locking piece 46 having a rectangular section is fixedly attached to the free end of the rod 45. A pair of opening/closing arms 47, 48 having recesses 47a, 48a and projections (position regulating means) 47c, 48c, respectively, are rotatably mounted, at their one corners, on the end portion 41b of the escape portion 41 so as to pivot round pins 49, 50, respectively. Notches 47b, 48b are formed in opposed inner surfaces of the arms 47, 48, respectively, and the above-mentioned locking piece 46 is received in the notches 47b, 48b. The cylinder chamber 42, pressurized fluid passages 43a, 43b, piston 44, rod 45, locking piece 46 and notches 47b, 48b constitute a drive means for charging the C-ring. Other constructions or arrangements of the third embodiment are the same as those of the first embodiment.

In the third embodiment, when the escape portion 41 is returned to the charging position after one C-ring is received in the recesses 47a, 48a, the pressurized fluid is introduced into the cylinder chamber 42 through the pressurized fluid passage 43a. Consequently, the piston 44 is shifted toward the body 41a, with the result that these arms 47, 48 are slightly rotated until the free ends thereof abut against each other since the locking piece 46 is locked against the paired opening/closing arms 47, 48, thus charging the C-ring. On the other hand, when the pressurized fluid is introduced into the cylinder chamber 42 through the passage 43b, the paired opening/closing arms 47, 48 are opened to reach a position shown in FIG. 8, thus releasing the charging of the C-ring.

Next, a fourth embodiment of the present invention will be explained.

Figure 9A:
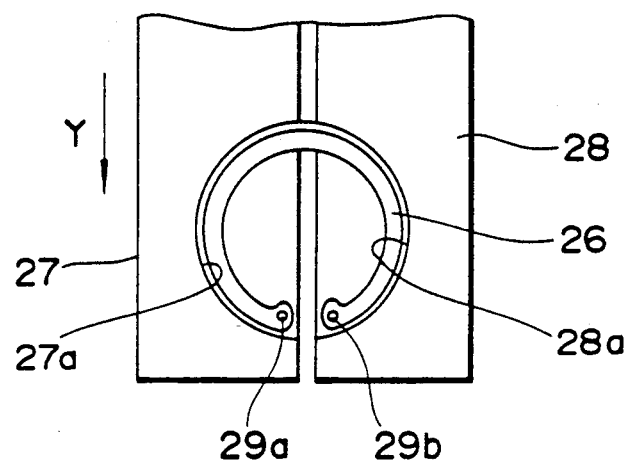
FIG. 9A is an enlarged plan view of a portion of a separating charge means according to a fourth embodiment.
Figure 9B:
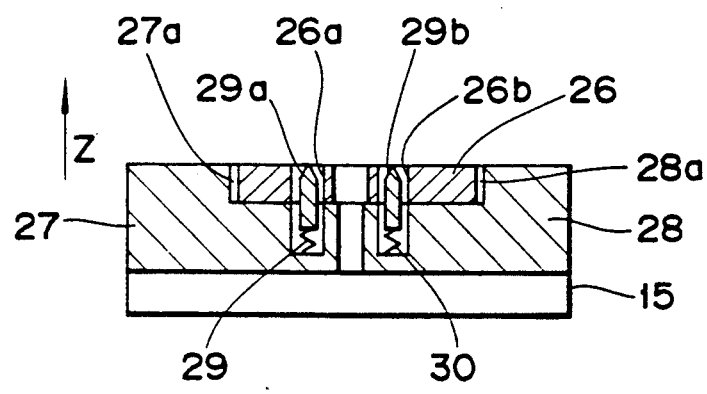
FIG. 9B is a sectional end view of the portion of FIG. 9A.

As shown in FIG. 9A and FIG. 9B, a pair of opening/closing arms 27, 28 have semi-circular recesses 27a, 28a, respectively, in which holes are formed. The position of these holes is so selected that, when the C-ring 26 having a free diameter is received in the recesses 27a, 28a, the holes are aligned with the holes 26a, 26b formed in the C-ring. The diameters of the holes are the same as those of the holes 26a, 26b of the C-ring. Further, springs 29, 30 are disposed in the holes 26a, 26b, respectively, and one end of each spring 29, 30 is fixed to a bottom of the corresponding holes 26a, 26b. Further, lower end portions of pins 29a, 29b biased upwardly by the corresponding springs 29, 30 are received in the holes 26a, 26b, respectively, and are fixedly attached to the other ends of the springs 29, 30, respectively. Other constructions or arrangements of the fourth embodiment are the same as those of the first embodiment. The above-mentioned holes 26a, 26b, pins 29a, 29b and springs 29, 30 constitute a position regulating means.

According to the fourth embodiment having the above-mentioned arrangement, as one C-ring 26 is received in the recesses 27a, 28a, the pair of pins 29a, 29b are inserted into the holes 26a, 26b of the C-ring 26, respectively, thus preventing the C-ring 26 from shifting in the circumferential direction. And, when the escape portion 15 is advanced to the original position, a pair of cylinders are driven, thus charging the C-ring 26. Then, when two pins of a finger means are inserted into the holes 26a, 26b of the C-ring 26, respectively, the pins 29a, 29b are pressed downwardly in opposition to the biasing force of the springs 29, 30.

In this fourth embodiment, while an example that the holes are formed in the paired arms 27, 28, respectively, and the springs 29, 30 and pins 29a, 29b are received into the holes was explained, the present invention is not limited to this example, but, a hole may be formed in only one of the arms, and a spring and a pin are received in this hole.

In the above-mentioned embodiments, while an example that the Cartesian coordinates robot is used as the feeding means, the present invention is not limited to this example, but, a biaxial robot may be used. In this case, it is necessary that the two pins of the finger means, the recesses of the opening/closing arms when they are in the charging position, and the C-ring receiving recess of the work be disposed on the same straight line. Further, the present invention is not limited to the Cartesian coordinates robot or the biaxial robot, but, a cylindrical robot or other feeding means may be adopted.

Further, in the above-mentioned embodiments, while an example that the paired opening/closing arms are pivotally mounted on the escape portion was explained, the present invention is not limited to this example, but, only one of the opening/closing arms may be pivotally mounted on the escape portion. In this case, in the first, second and fourth embodiments, the cylinder for the other arm can be omitted, thus making the separating and supplying device more compact.

With the arrangements as mentioned above, the present invention provides the following advantages.

That is to say, since the C-ring cannot be shifted in the circumferential direction so that the C-ring is not out of position in the circumferential direction when the C-ring is received in the recesses, the two pins of the finger means can be inserted into the two holes of the C-ring without fail. Further, since the two pins of the finger means are inserted into the two holes of the C-ring after the separated C-ring is charged by the paired arms, the C-ring is not out of position, thus facilitating the insertion of the pins of the finger means into the holes of the C-ring. In addition, since the C-ring is charged by closing the paired arms, the charging of the C-ring can be performed without fail. Furthermore, since a principle of lever is utilized, it is possible to use a small-sized drive means for charging the C-ring, thus making the whole apparatus compact.

Next, a fifth embodiment of the present invention will be explained.

Figure 10A:
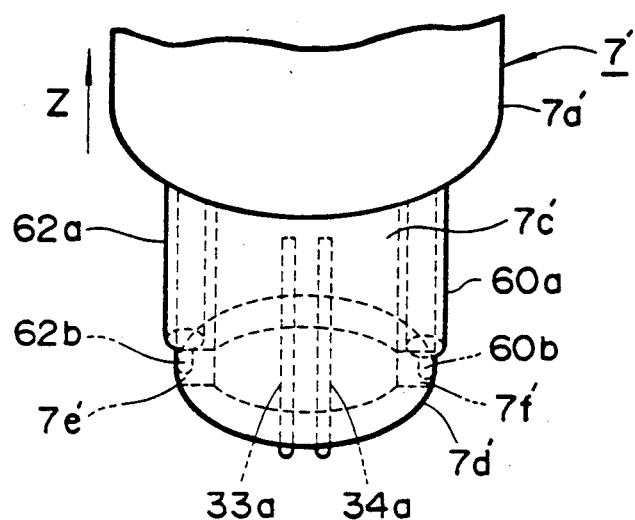
FIG. 10A is a perspective view of a finger means of an elastic ring mounting apparatus according to a fifth embodiment.
Figure 10B:
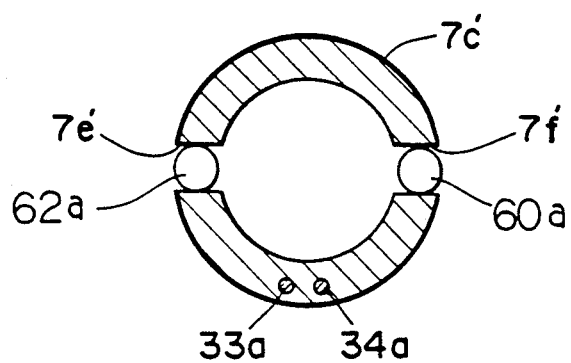
FIG. 10B is a cross-sectional view of the finger means of FIG. 10A.

As shown in FIGS. 10A and 10B, a finger means 7' of integral type according to the fifth embodiment has an insertion portion 7c' protruding from a body 7a' thereof downwardly and having a smaller diameter than that of the body 7a'. The greater part of two pins 33a, 34a acting as a charge holding means is inserted into the insertion portion 7c' and is fixed therein. These two pins 33a, 34a extend in a Z direction and free ends of the pins protrude from a lower surface 7d' of the insertion portion 7c' by a height corresponding to a thickness of the C-ring. Notches 7e', 7f' extending in an axial direction (Z direction) are formed on both lateral edges of the insertion portion 7c'. A pair of cylinders 62a, 60a having rods 62b, 60b, respectively, are fixed to the walls of the corresponding notches 7e', 7f' in such a manner that the cylinders are disposed in the respective notches. When the pair of cylinders 62a, 60a are driven synchronously with each other to extend the respective rods 62b, 60b, a C-ring (not shown) held by the two pins 33a, 34a is pushed downwardly, whereby the C-ring can be removed from the pins 33a, 34a, thus releasing the charging of the C-ring. The pairs of cylinders 62a, 60a and rods 62b, 60b constitute a charge releasing means for the C-ring.

Other constructions of the fifth embodiment are the same as those of the first embodiment, and, thus, the explanation thereof will be omitted.

Next, an operation of the apparatus according to the fifth embodiment will be explained, with regard to only the different matters from the first embodiment.

When the finger means 7' holding the charged C-ring and positioned with respect to the insertion opening of the work is shifted downwardly by the third position shifting amount, the insertion portion 7c' and the C-ring are inserted into the insertion opening of the work and at the same time the lower surface of the C-ring is positioned at the upper end of the C-ring receiving groove. Then, when the paired cylinders 62a, 60a are driven to extend the respective rods 62b, 60b, the C-ring is pushed downwardly by the rods 62b, 60b, with the result that the C-ring is removed from the pins 33a, 34a. Consequently, the diameter of the C-ring is increased by its own repelling (or elastic) force, whereby the C-ring is fitted in the C-ring receiving groove.

Figure 11:
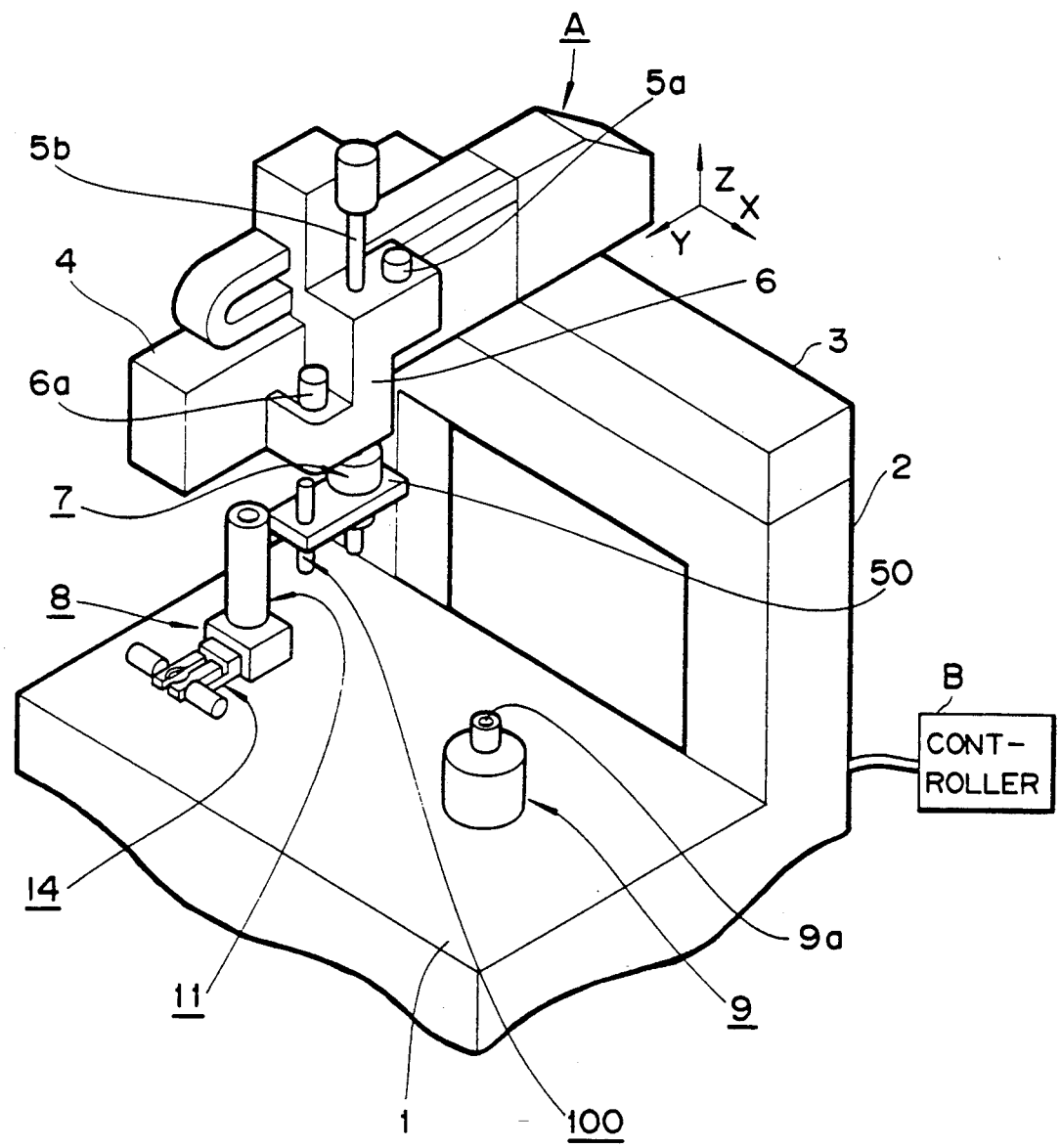
FIGS. 11 to 13 show an elastic ring mounting apparatus with a mounting condition inspecting apparatus, according to a sixth embodiment of the present invention, where.

FIG. 11 is a perspective view of a C-ring mounting apparatus according to a sixth embodiment of the present invention, which can carry out a method for inspecting a mounting condition of a C-ring.

The reference numeral A denotes a Cartesian coordinates robot constituting a feeding means, which comprises an X-axis arm 3 fixed to a column 2 of a base 1 and extending in an X direction, a Y-axis arm 4 supported by the X-axis arm 3 for movement in the X direction and reciprocally shifted in the X direction by means of an X-axis drive means (not shown), and a Z-axis arm attachment member 6 supported by the Y-axis arm 4 for movement in the Y direction and reciprocally shifted in the Y direction by means of an Y-axis drive means (not shown).

The Z-axis arm attachment member 6 rotatably supports a Z-axis arm 5b extending in a Z direction, which arm 5b is reciprocally shifted in the Z direction by means of a conventional ball/screw mechanism driven by a motor 5a. The X-axis arm attachment member 6, Z-axis arm 5b, motor 5a and ball/screw mechanism constitute an insertion means of the feeding means.

On the other hand, a finger means 7 is rotatably mounted on a lower end of the Z-axis arm 5b and is provided with a conventional transmitting mechanism driven by a motor 6a wherein a rotational force is transmitted regardless of a shifted position thereof in the Z direction. By energizing the motor 6a, the finger means 7 is rotated in a circumferential direction to be oriented toward a desired direction.

A C-ring mounting condition inspecting apparatus 100 for carrying out the method for inspecting the mounting condition of the C-ring according to the present invention is mounted on a base plate 50 to which the finger means 7 is attached, near the separating and supplying device 8.

Figure 12:
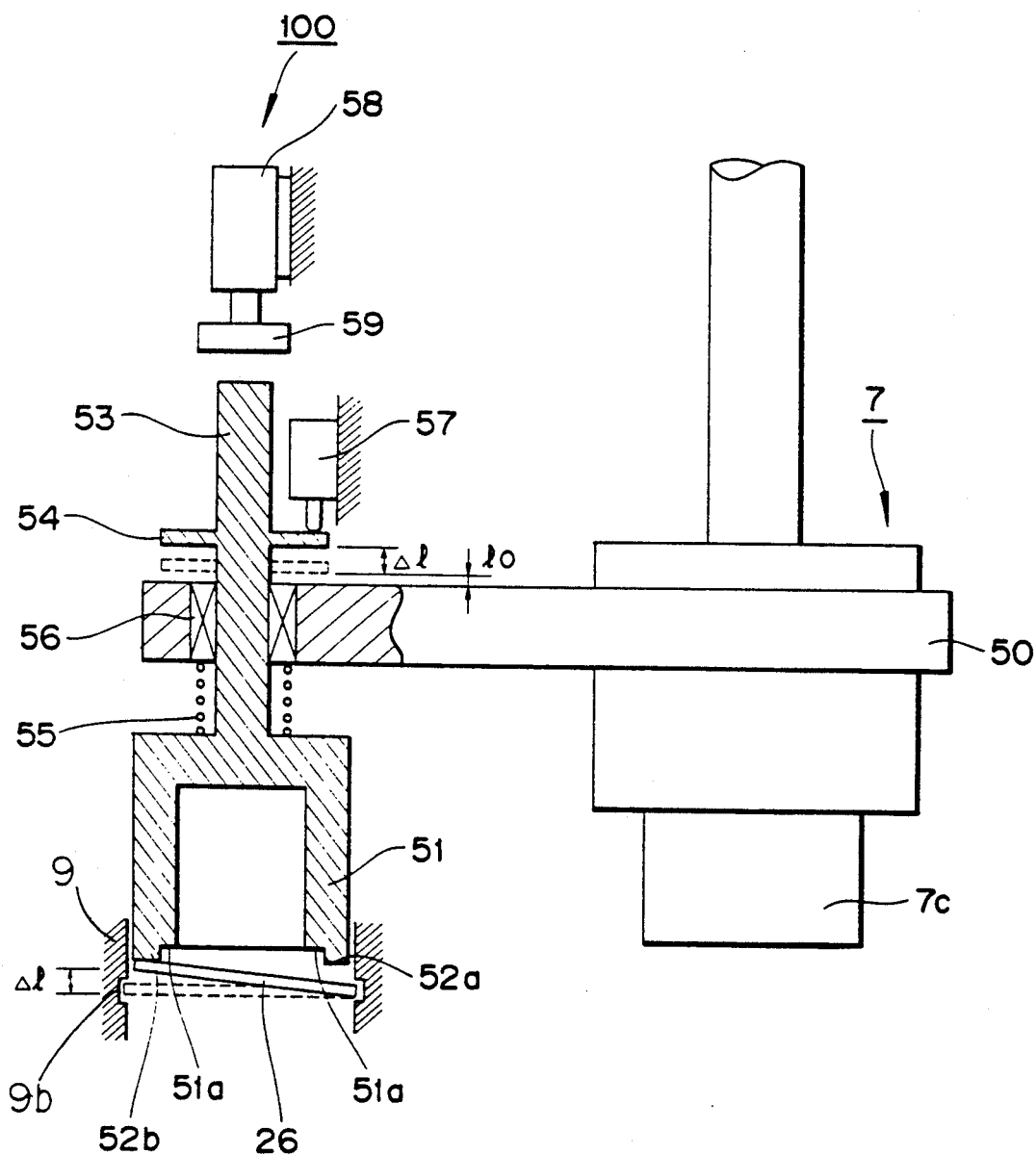

In the C-ring mounting condition inspecting apparatus 100, as shown in FIG. 12, a shaft 53 is mounted on the base plate 50 via a sliding bearing 56. A lower end of the shaft 53 is connected to a central portion of an upper surface of a cylindrical probe 51 having a bottom opening. Two contact pieces (first piece 52a and second piece 52b) having lower surfaces flush with each other are integrally formed on a lower surface 51a of the probe 51 in such a manner that these contact pieces are opposed to each other. Further, the probe 51 has the same inner and outer diameters as those of the insertion portion 7c of the finger means 7. In addition, a compression spring 55 encircling the shaft 53 is disposed between the probe 51 and the base plate 50, so that the probe 51 is biased downwardly by the compression spring 55 with a predetermined force.

A flange 54 is formed on a portion of the shaft 53 protruding upwardly from the base plate 50, and a position detector 57 such as an electrical micrometer for detecting a height of the flange 54 from the base plate 50 is attached to an inner surface of a case (not shown) of the C-ring mounting condition inspecting apparatus 100 in such a manner that a height of the detector from the base plate 50 becomes constant.

A cylinder 58 is also attached to the inner surface of the case of the C-ring mounting condition inspecting apparatus 100. By pushing the shaft 53 down by means of a rod 59 attached to a lower end of the cylinder 58, the probe 51 can be pushed down.

Figure 13:
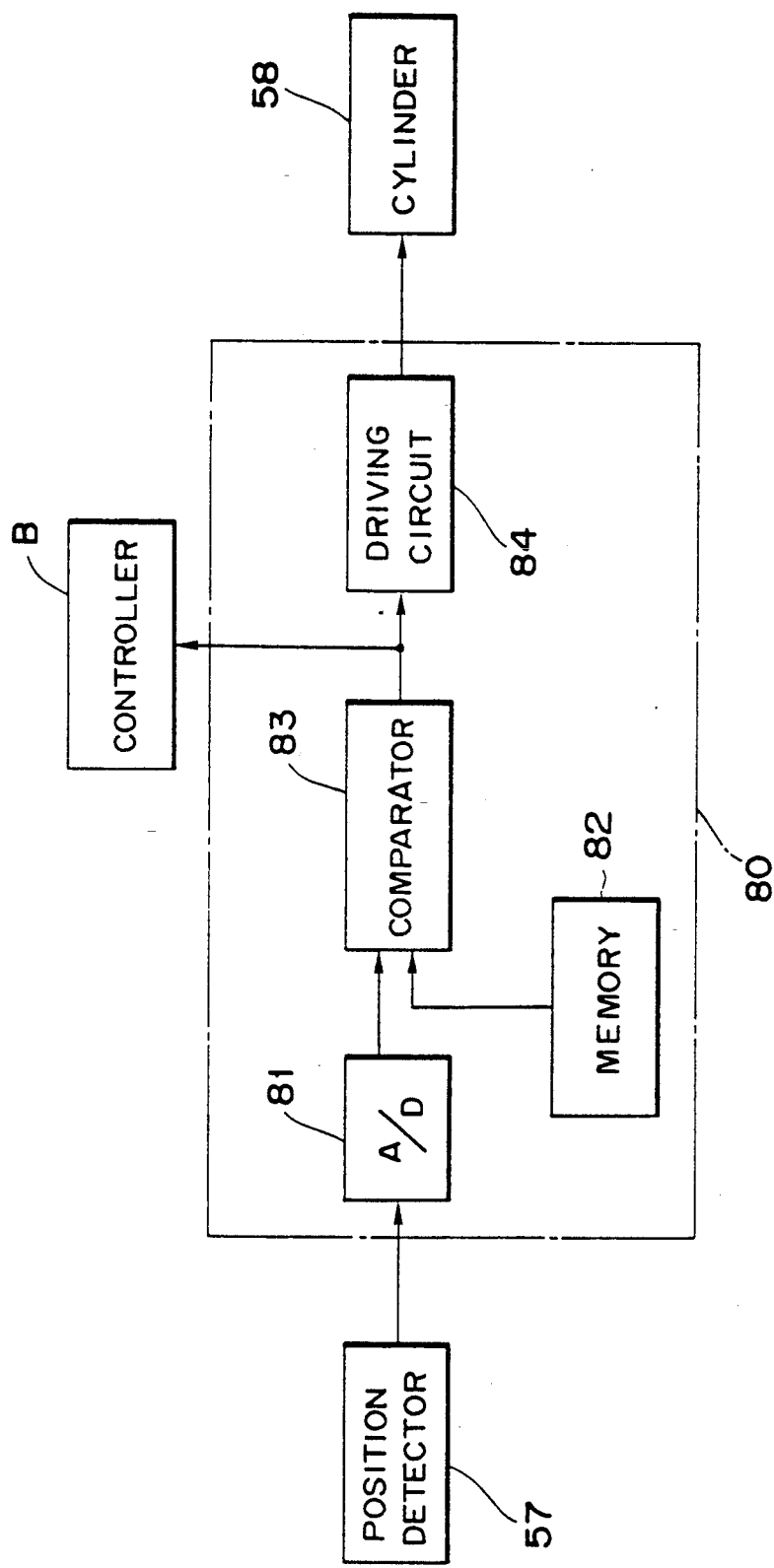

The cylinder 58 can be driven by a cylinder driving device 80 as shown in FIG. 13. The cylinder driving device 80 includes an analogue/digital converting circuit (referred to as "A/D converting circuit" hereinafter) 81 for converting an analogue signal representative of a height of the flange 54 (i.e., height of the first and second contact pieces 52a, 52b) sent from the position detector 57 into a digital signal, a member 82 in which a reference value $\lambda_0$ for the height of the contact pieces is previously set, a comparator 83 for obtaining a difference between the height of the contact pieces (converted into the digital electrical signal) and the reference value $\lambda_0$ stored in the memory 82 and for outputting an output electrical signal "0" when the difference falls within a predetermined range or outputting an output electrical signal "1" when the difference is out of the predetermined range, and a driving circuit 84 for driving the cylinder 58 when the output electrical signal from the comparator 83 is "1".

A controller B shown in FIG. 11 serves to control the activation of the aforementioned X-axis drive means, Y-axis drive means and motors 5a, 6a on the basis of an inputted program.

The controller B activates the Cartesian coordinates robot A in accordance with a program wherein the following five position shifting amounts are previously set:

(1) a first position shifting amount of the finger means 7 from the original position to the separating charge means 14;

(2) a second position shifting amount of the finger means 7 from the separating charge means 14 to the insertion position regarding the work 9;

(3) a third position shifting amount of the finger means 7 from the insertion position regarding the work 9 to the C-ring receiving groove;

(4) a fourth position shifting amount of the C-ring mounting condition inspecting apparatus 100 to the insertion position regarding the work 9; and (5) a fifth position shifting amount of the C-ring mounting condition inspecting apparatus 100 from the insertion position to the C-ring receiving groove.

In this case, since the controller B controls the activation of the X-axis drive means, Y-axis drive means and motor 5a of the Cartesian coordinates robot A, the finger means 7 is automatically shifted in the triaxial directions. That is to say, the finger means 7 previously positioned in the original position is automatically shifted to the separating charge means 14, and then is automatically shifted directly above the insertion opening 9a of the work 9 (i.e., the insertion position) and is positioned there. The finger means 7 is further shifted so that the C-ring held by the finger means 7 is received in the C-ring receiving groove of the work 9.

After the C-ring 26 is fitted in the C-ring receiving groove 9b of the work 9, the Cartesian coordinates robot A shifts the C-ring mounting condition inspecting apparatus 100 in the triaxial direction by the fourth position shifting amount, with the result that the probe 51 (FIG. 12) of the C-ring mounting condition inspecting apparatus 100 is positioned directly above the insertion opening 9a of the work 9 (i.e., the insertion position). Thereafter, the controller B activates the motor 5a (FIG. 11) so that the C-ring mounting condition inspecting apparatus 100 is shifted downwardly together with the finger means 7 by the fifth position shifting amount, thereby inserting the probe 51 into the insertion opening 9b of the work 9. In this case, since the probe 51 has the cylindrical configuration, it does not interfere with the shaft 9c of the work 9.

Now, if the C-ring 26 is correctly fitted in the C-ring receiving groove 9b as shown by the broken line in FIG. 12, the probe 51 is stopped at a height condition wherein the first and second contact pieces 52a, 52b are both contacted with the C-ring 26 and the compression spring 55 is slightly compressed. In this condition, when the height of the flange 54 is detected by the position detector 57, such height will be substantially the same as the reference value $\lambda_0$ stored in the member 82 (FIG. 13). Accordingly, in this case, it is judged that the C-ring 26 is correctly fitted in the C-ring receiving groove 9b of the work 9, and thus, the controller B receives the output electrical signal "0" from the comparator 83 (FIG. 13) and returns the finger means 7 to its original position. In this way, one cycle for the C-ring inserting operation is finished.

On the other hand, if the C-ring 26 is not correctly fitted in the C-ring receiving groove 9b of the work 9 as shown by the solid line in FIG. 12, the probe 51 and the shaft 53 are stopped when only the contact piece 52b is contacted with the C-ring 26, but, the base plate 50 is lowered by the fifth position shifting amount in opposition to the repelling force of the compression spring 55. As a result, after lowered, the distance between the flange 54 and the base plate 50 is increased. In this condition, when the height of the flange 54 is detected by the position detector 57, such height will be greater than the reference value $\lambda_0$ by $\Delta \lambda$. Accordingly, if the difference $\Delta \lambda$ between the actual height of the flange and the reference value $\lambda_0$ obtained from the comparator 83 (FIG. 13) is out of a predetermined range, it is considered that the C-ring 26 is not correctly fitted. In this case, the cylinder 58 is driven by the driving circuit 84, thus lowering the shaft 53 by a predetermined amount by means of the rod 59. Consequently, the probe 51 is pushed down, with the result that a portion of the C-ring 26 contacting the second contact piece 52b is also pushed down, thereby fitting the C-ring 26 in the C-ring receiving groove 9b correctly. Thereafter, the controller B controls the Cartesian coordinates robot A to return the finger means 7 to its original position. In this way, one cycle for the C-ring inserting operation is finished.

Then, the work 9 is replaced by a new one, and, thereafter, the above-mentioned operation or sequence is repeated. In this way, the C-rings can be mounted on the works successively. Further, when the positions of the finger means 14 and the work 9 are changed, and/or when the kind of the work is changed, to the controller is inputted a new program wherein five new position shifting amounts (corresponding to amounts after change) are set.

In the illustrated embodiment, while an example that two contact pieces (first contact piece 52a and second contact piece 52b) are formed in the cylindrical probe 51 of the C-ring mounting condition inspecting apparatus 100 was explained, three or more contact pieces may be formed on the probe and equally spaced. However, in the case where the number of the contact pieces is increased, if the dirt and the like is adhered on the surface of the C-ring 26, when the contact pieces are inserted into the work 9 to inspect whether the C-ring 26 is correctly mounted in the work 9, it is feared that the erroneous detection occurs if any one of the contact pieces comes into contact with the dirt on the surface of the C-ring. Therefore, the number of the contact pieces may be a few or several so that the probability of the contact between the contact piece and the dirt is reduced.

Further, if it is merely inspected whether the C-ring 26 is correctly mounted in the work 9 or not, the cylinder 58 and the rod 59 shown in FIG. 12 may be omitted.

Further, the C-ring mounting condition inspecting apparatus 100 is not necessarily provided on the Cartesian coordinates robot A shown in FIG. 11, but may be attached to another Cartesian coordinates robot.

In the illustrated embodiment, while an example that the piston slidably received in the cylinder chamber acts as the drive means for the two pins 33, 34 of the finger means 7 was explained, the drive means is not limited to this example, but, the two pins may be driven synchronously by two discrete pistons slidably received in respective cylinders. Further, in place of the piston and the cylinder chamber, an electrical drive means such as a solenoid can be utilized.

Further, while an example that the Cartesian coordinates robot A shown in FIG. 11 is used as the feeding means, the present invention is not limited to this example, but, a biaxial robot may be used. In this case, it is necessary to arrange the two pins 33, 34 of the finger means 7, the recesses 18, 19 of the paired opening/closing arms 16, 17 and the C-ring receiving groove 9b of the work 9 on the same straight line. Further, the present invention is not limited to the Cartesian coordinates robot, but, a cylindrical robot, a polar coordinates robot, an articulated robot and other feeding means may be adopted.

In addition, while an example that the paired opening/closing arms 16, 17 are pivotally mounted on the escape portion 15 was explained, the present invention is not limited to this example, but, only one of the opening/closing arms may be pivotally mounted on the escape portion. In this case, the cylinder for the other arm can be omitted, thus making the separating and supplying device 8 more compact.

With the arrangements as mentioned above, the present invention provides the following advantages.

That is to say, since the engagement condition of the C-ring is inspected by inserting the probe having a plurality of contact pieces into the work in which the C-ring is mounted, by detecting the height of the probe when at least one of the contact pieces is contacted with the surface of the C-ring, and by comparing the detected height with the predetermined height reference value, the engagement condition of the C-ring mounted in the C-ring receiving groove of the work can be inspected automatically and not manually.

Furthermore, since the probability of the contact between the contact piece and the dirt adhered to the surface of the C-ring mounted in the C-ring receiving groove of the work can be reduced by providing several contact pieces having the lower surfaces flush with each other on the probe and being equally spaced in the circumferential direction (for example, in diametrically opposed relation), the inspection of the C-ring mounting condition can be effected accurately.

Next, a seventh embodiment of the present invention will be explained with reference to the drawings.

First of all, an elastic ring mounting apparatus according to the present invention will be schematically described with reference to FIG. 14.

A Cartesian coordinates robot A comprises an X-axis arm 103 fixed to a column 102 of a base 101 and extending in an X direction, a Y-axis arm 104 supported by the X-axis arm 103 for movement in the X direction and reciprocally shifted in the X direction by means of an X-axis drive means (not shown), and a Z-axis arm attachment member 106 supported by the Y-axis arm 104 for movement in a Y direction and reciprocally shifted in the Y direction by means of an Y-axis drive means (not shown).

The Z-axis arm attachment member 106 rotatably supports a Z-axis arm 105b extending in a Z direction, which arm 105b is reciprocally shifted in the Z direction by means of a conventional ball/screw mechanism driven by a motor 105a. The Z-axis arm attachment member 106, Z-axis arm 105b, motor 105a and ball/-screw mechanism constitute a feeding means. On the other hand, a finger means 107 is rotatably mounted on a lower end of the Z-axis arm 105b and is provided with a conventional transmitting mechanism driven by a motor 106a wherein a rotational force is transmitted regardless of a shifted position thereof in the Z direction. By energizing the motor 106a, the Z-axis arm 105b is shifted to the Z direction while being rotated; but, in this case, the finger means 107 does not rotate. And, by energizing the motor 106a, the finger means 107 is rotated in the Z direction to be positioned, via the transmitting mechanism. As will be described later, a controller B serves to control the activation of the Cartesian coordinates robot A and the motors 105a, 106a.

A separating and supplying device 108 mounted on the base 101 comprises a supply means 111 for storing a plurality of C-rings (not shown) for holes, and a separating means 114 for receiving one C-ring for hole separated from the supply means 111. Further, a two-stepped cylindrical work (article) 109 having an insertion opening 109a and a C-ring receiving groove (not shown) is also mounted on the base 101.

Next, various parts and means of the C-ring mounting apparatus will be fully explained with reference to FIG. 15, FIG. 16A, FIG. 16B, FIG. 17 and FIG. 18.

Figure 14:
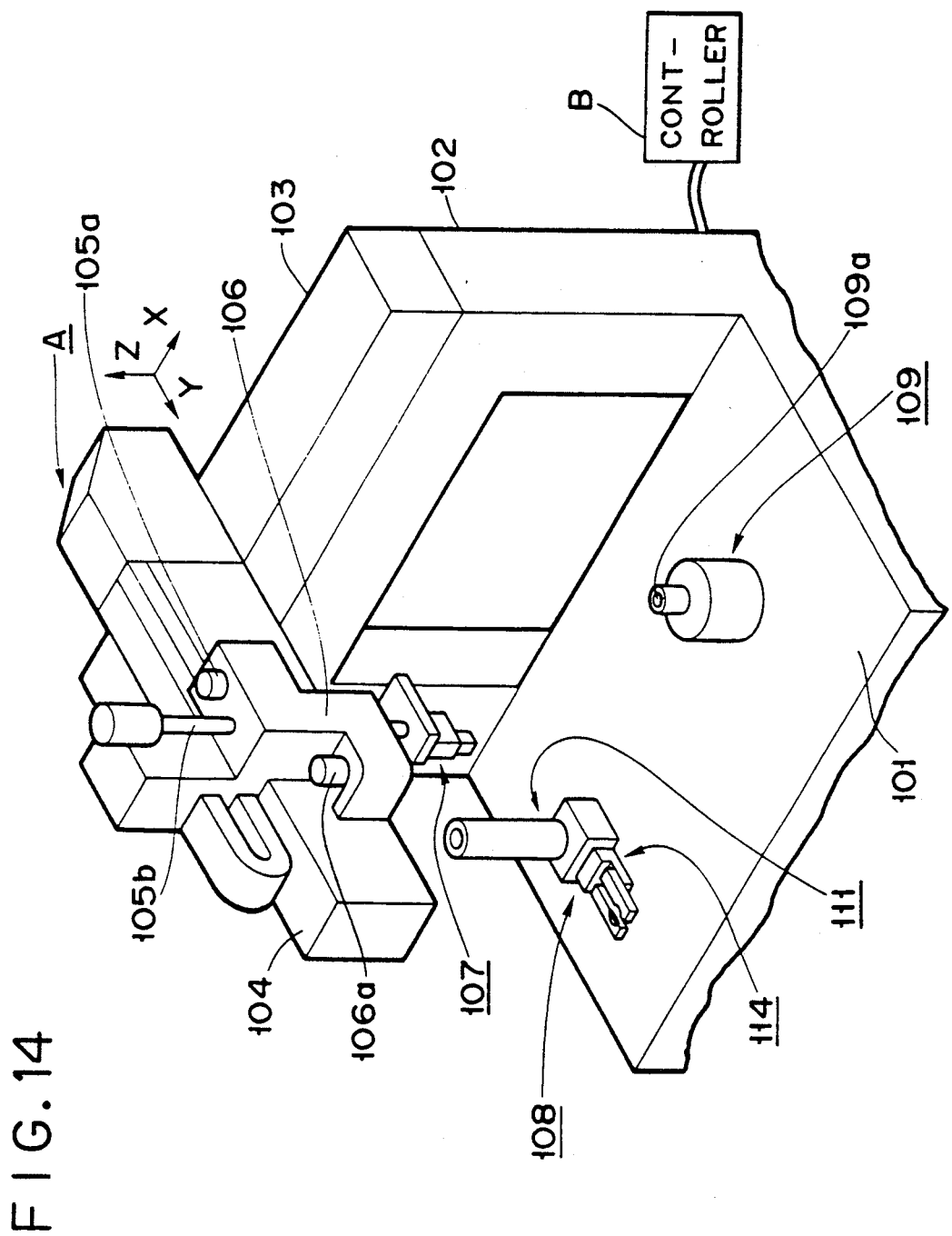
FIG. 14 is a perspective view of an elastic ring mounting apparatus with a separating and supplying device according to a seventh embodiment of the present invention.
Figure 15:
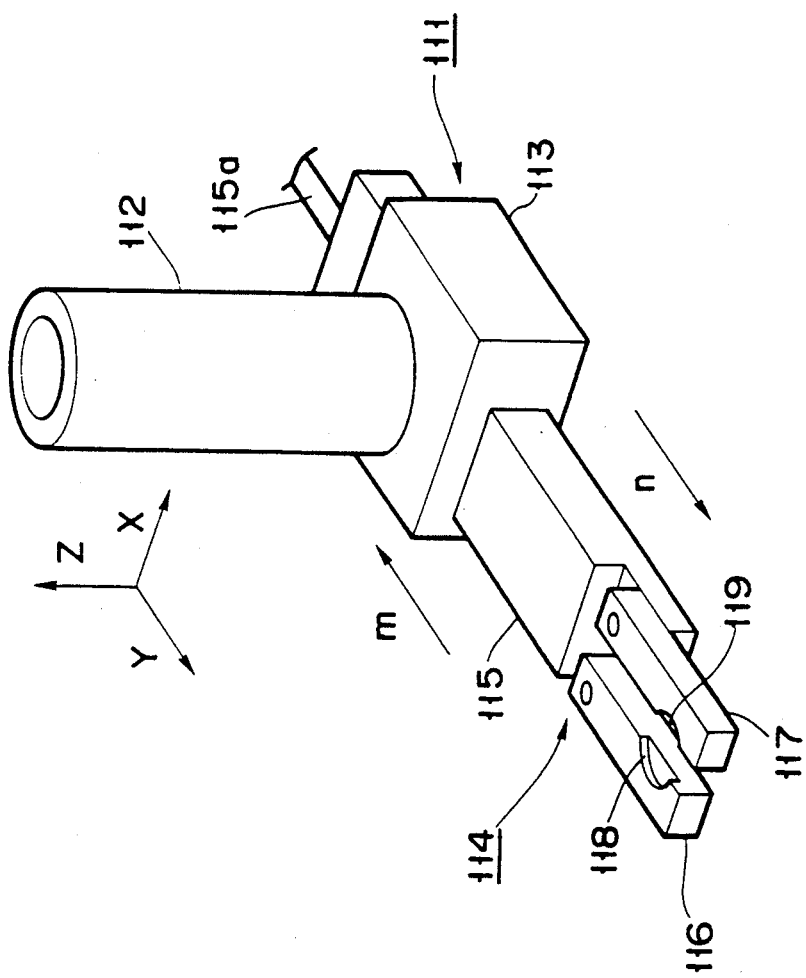
FIG. 15 is an enlarged perspective view of the separating and supplying device of FIG. 14.

As shown in FIG. 15, the supply means 111 of the separating and supplying device 108 (refer to FIG. 14) comprises a magazine 112 for storing a plurality of C-rings (not shown) for holes oriented in the same direction and stacked vertically, and a body 113 supporting a lower end of the magazine 112 and communicated with a lower end of a supply opening of the magazine 112. On the other hand, a plate-shaped escape portion 115 forming a part of the separating means 114 extends through the body 113 and is provided at its one end with a rod 115a of an air cylinder (not shown) attached thereto. Thus, the escape portion 115 can be reciprocally shifted in the Y direction by means of the air cylinder.

Figure 16A:
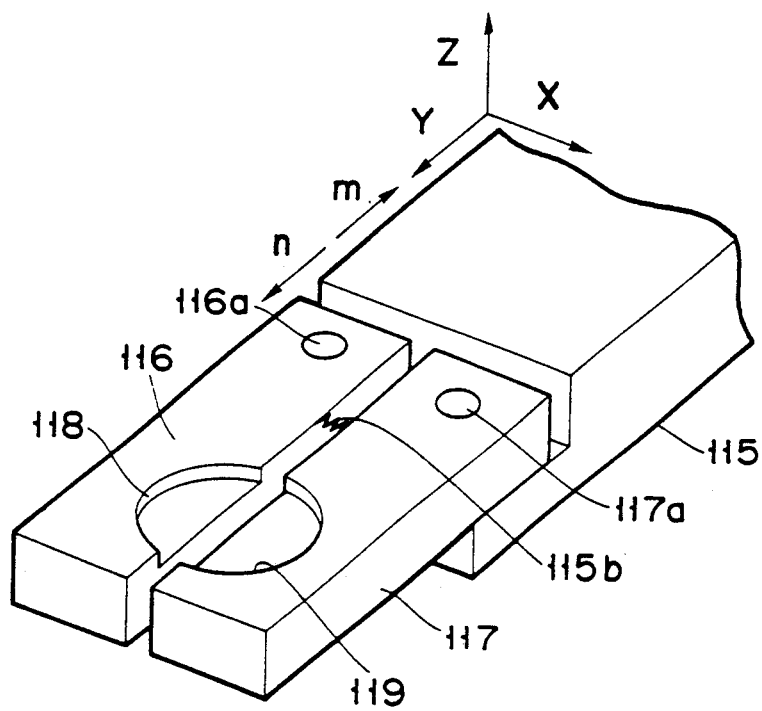
FIG. 16A is an enlarged perspective view of a portion of the separating and supplying device of FIG. 15.
Figure 16B:
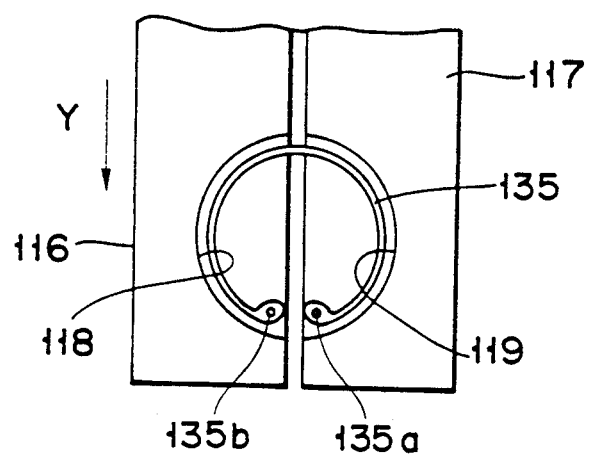
FIG. 16B is an enlarged plan view of a portion of FIG. 16A.

As shown in FIG. 16A and FIG. 16B, a pair of receiving members 116, 117 are pivotally mounted on an upper surface of a front part of the escape portion 115 so as to pivot round pins 116a, 117a, respectively. A compression spring 115b is disposed between opposed side surfaces of the paired receiving members 116, 117, thus always biasing the receiving members 116, 117 toward an open position. Upper surfaces of the receiving members 116, 117 are flush with an upper surface of the escape portion 115. Semi-circular recesses 118, 119 each having a dimension sufficient to receive a half portion of the C-ring 135 (for hole) having a free diameter are formed in upper surfaces of the receiving members 116, 117 at their front parts, respectively. A depth of each recess 118, 119 substantially equals a thickness of the C-ring 135. A circumference of the C-ring 135 received in the recesses 118, 119 is regulated by inner surfaces of the recesses 118, 119. With the arrangement as mentioned above, as the escape portion 115 is reciprocally shifted in the Y direction by means of the air cylinder (not shown), when the recesses 118, 119 are positioned below the C-rings stacked in the magazine 112 (FIG. 15), a lowermost C-ring is dropped down by its own weight to be received in the recesses 118, 119. Thereafter, by returning the escape portion 115 to the original position (condition shown in FIG. 16A), the C-ring 135 can be separated from the other C-rings.

Figure 17:
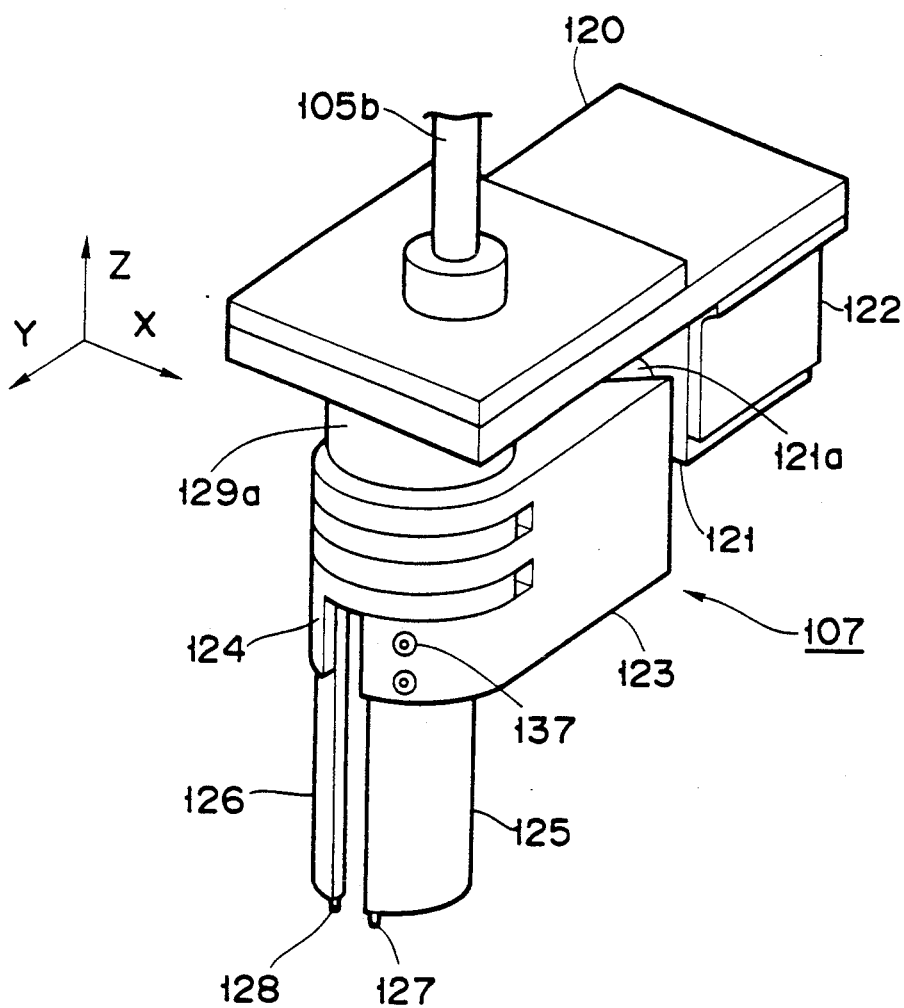
FIG. 17 is an enlarged perspective view of a finger means of FIG. 14.
Figure 18:
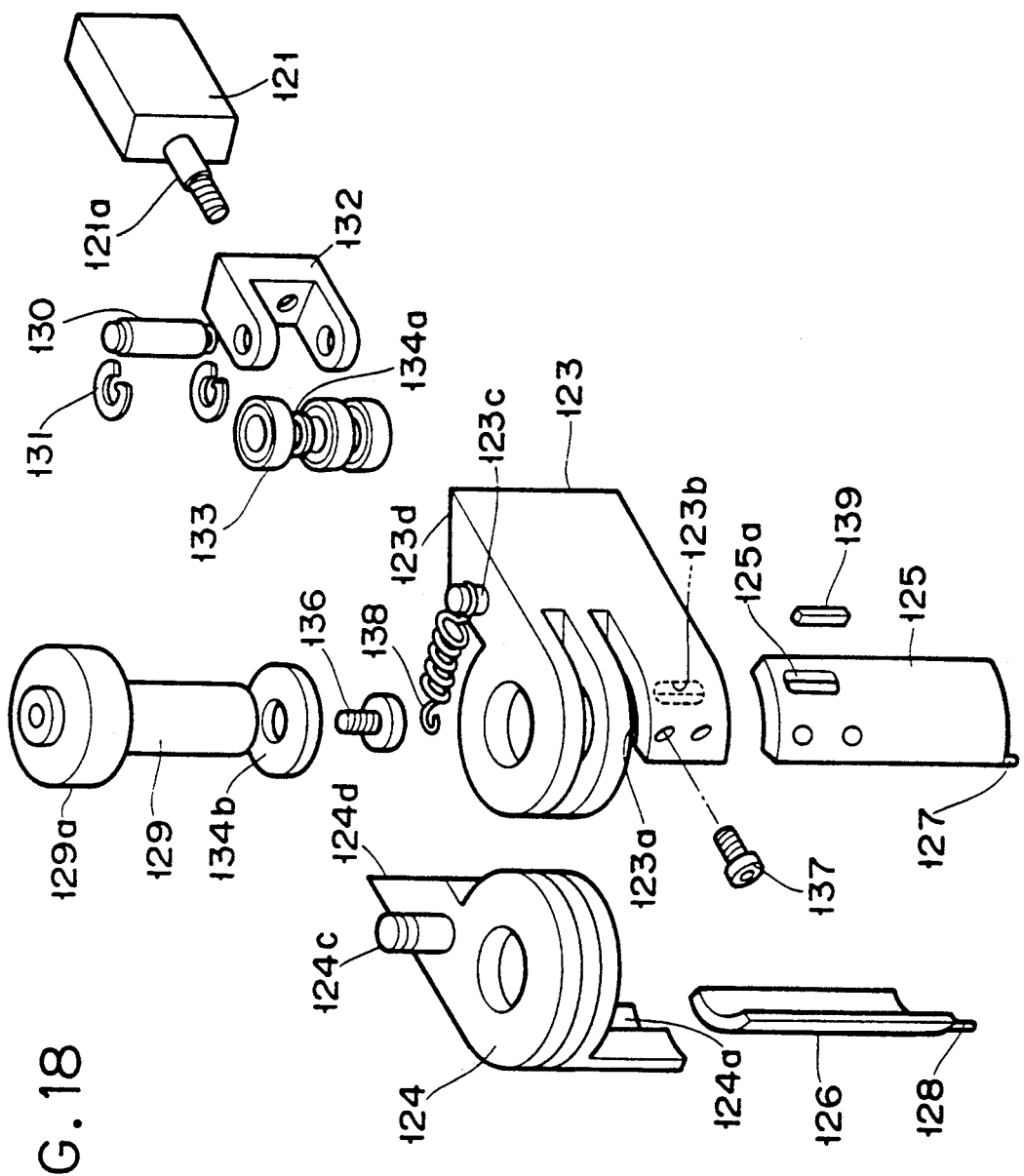
FIG. 18 is an exploded perspective view of the finger means of FIG. 17.

FIG. 17 is a perspective view of the finger means 107, and FIG. 18 is an exploded perspective view of the finger means. As shown in these Figures, the finger means 107 has a plate 120 rotatably supported on the lower end of the Z-axis arm 105b, and an air cylinder 121 is fixed to a lower surface of the plate 120 at its one end via brackets 122. A rod 121a of the air cylinder 121 extends in the Y direction and is provided at its free end with an inverted C-shaped joint 132 threaded at its central portion to the rod. A shaft 130 passes through holes formed in the upper and lower front ends of the joint 132 and is held on the joint by a pair of E-rings 131. Further, between the upper and lower front ends of the joint 132, three bearings 133 and two washers 134a are fitted on the shaft 130 alternately.

A post 129 having a flange 129a is non-rotatably fixed to the other end of the plate 120, and a pair of levers 123, 124 are rotatably mounted on the post 129. Further, the levers 123, 124 are held on the post by a washer 134b fixed to a lower end of the post 129 by means of a screw 136 so that the levers are prevented from falling off from the post 129. Inclined surfaces 123d, 124d are formed on rear ends of the levers 123, 124, respectively, which inclined surfaces 123d, 124d can be abutted against the three bearings 133. Further, notches 123a, 124a and keyways 123b (only one of which is shown in relation to the lever 123) are formed in lower ends of the levers 123, 124, respectively Upper ends of hoods 125, 126 cooperating to constitute an insertion portion are fitted into the respective notches 123a, 124a. The upper ends of the hoods 125, 126 are secured to the respective levers 123, 124 by two screws 127, respectively, and further, keys 139 (only one of which is shown in relation to the lever 123) are fitted into the respective keyways 123b of the levers 123, 124 and respective keyways 125a formed in the hoods 125, 126, so that the hoods 125, 126 are positioned with respect to the respective levers 123, 124 and are rigidly fixed to the respective levers 123, 124. Each hood 125, 126 comprises an arcuated plate having a radius of curvature smaller than that of the insertion opening 9a of the work 9 (FIG. 14) so that it can be inserted into the insertion opening 9a. Further, pins 127, 128 (described later) protrude from lower ends of the hoods 125, 126, respectively, and a length of each pin 127, 128 is the same as the thickness of the C-ring 135 (FIG. 16B).

Figure 20A:
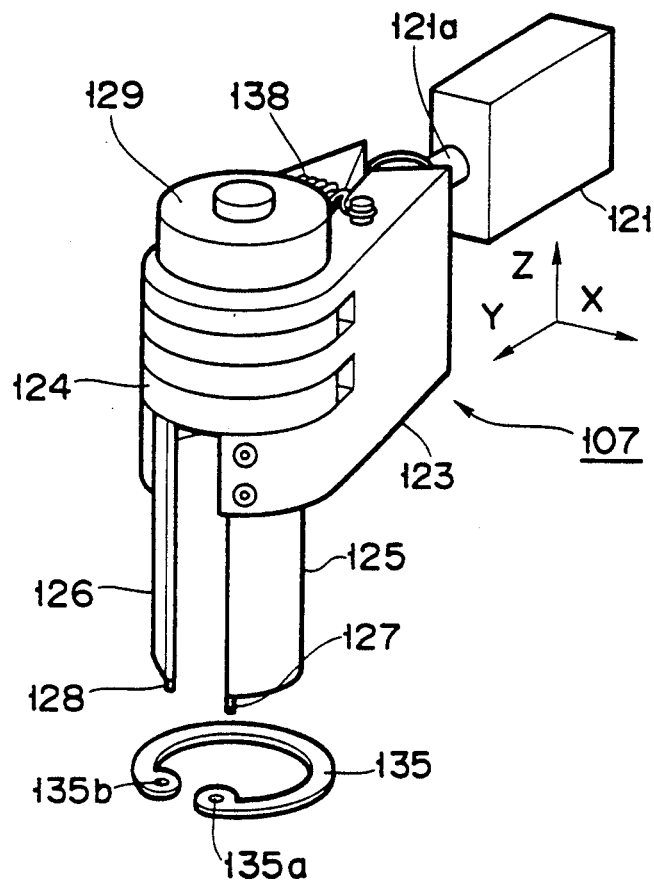
FIG. 20A is a perspective view of the finger means.
Figure 20B:
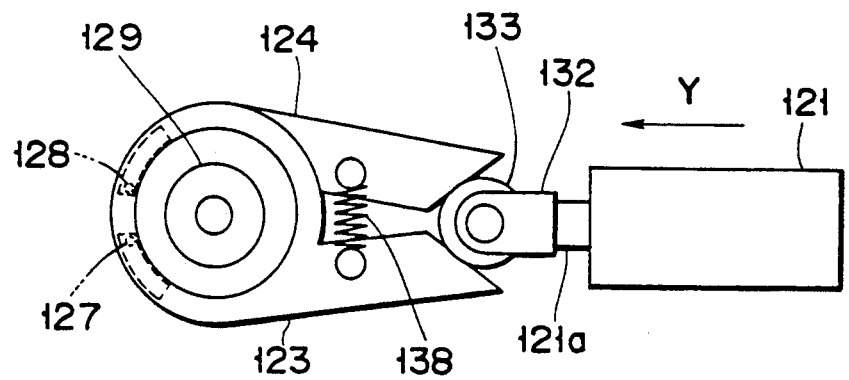
FIG. 20B is a plan view of the finger means of FIG. 20A.

Locking pieces 123c, 124c are protruded upwardly from upper surfaces of the levers 123, 124, respectively. By arranging a tension spring 138 between the locking pieces 123c, 124c, the levers 123, 124 are biased so that the inclined surfaces thereof approach each other (FIGS. 20A and 20B). In this case, a distance between two pins 127, 128 equals a distance between the holes 135a, 135b of the C-ring 135 (FIG. 16B) having a free diameter (i.e., having a natural posture). In this condition, when the two pins 127, 128 are inserted into the holes 135a, 135b and the air cylinder 121 is activated to extend the rod 121a in the Y direction, the three bearings 133 are pressed against the inclined surfaces 123d, 124d of the levers 123, 124, with the result that the paired levers 123, 124 are rotated in opposition to the spring force of the tension spring 138 in a direction that the inclined surfaces 123d, 124d are separated away from each other, thus reducing the distance between the pins 127, 128. Consequently, the diameter of the C-ring 135 is decreased, thereby charging the C-ring (see FIGS. 21 and 22). As apparent from the above explanation, the air cylinder 121, bearings 133, levers 123, 124 and the like constitute a charging means.

A controller B shown in FIG. 14 serves to control the activation of the X-axis drive means, Y-axis drive means and motors 105a, 106a on the basis of an inputted program. By inputting to the controller B a program wherein a first position shifting amount of the finger means 107 from the original position to the separating means 114, a second position shifting amount of the finger means 107 from the separating means 114 to the work 109, and a third position shifting amount of the finger means 107 from the insertion position regarding the work 109 to the C-ring receiving recess 109b (FIG. 21) are previously set, the Cartesian coordinates robot A is operated. In this case, since the controller B controls the activation of the X-axis drive means, Y-axis drive means and motor 105a of the Cartesian coordinates robot A, the finger means 107 is automatically shifted in the triaxial directions. That is to say, the finger means 107 previously positioned in the original position is automatically shifted to the separating means 114, and then is automatically shifted directly above the insertion opening 109a of the work 109 (i.e., the insertion position) and is positioned there. Thereafter, the finger means 107 is further shifted so that the C-ring 135 (FIG. 16B) held by the finger means 107 is received in the C-ring receiving groove 109b of the work 109.

Next, an operation of the apparatus according to this embodiment will be explained with reference to FIGS. 19 to 22.

First of all, the program wherein the first position shifting amount of the finger means 107 from the original position to the separating means 114, the second position shifting amount of the finger means 107 from the separating means 114 to the insertion position regarding the work 109, and the third position shifting amount of the finger means 107 from the insertion position regarding the work 109 to the C-ring receiving groove 109b are set is inputted to the controller B (FIG. 14).

Figure 19A:
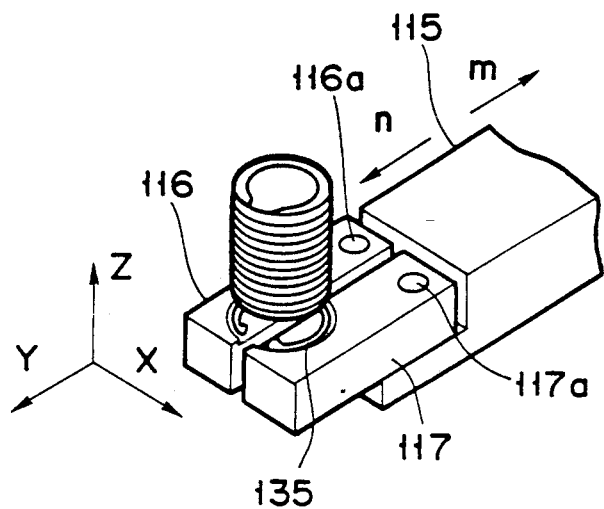
FIG. 19A is a perspective view of the separating and supplying device in a condition that one ring is being separated and FIG. 19B is a perspective view of the device in a condition that the ring has been separated.

When the recesses 118, 119 of the paired receiving members 116, 117 are shifted below the stacked C-rings by shifting the escape portion 115 from a position shown in FIG. 15 to a direction shown by the arrow m by means of the air cylinder (not shown), a lowermost C-ring is dropped down by its own weight to be received into the recesses 118, 119 (refer to FIG. 19A). Then, the escape portion 115 is shifted in a direction shown by the arrow n to be returned to the original position (refer to FIG. 19B). As the Cartesian coordinates robot A is operated, it shifts the finger means 107 previously positioned at the original position in the triaxial directions by the first position shifting amount on the basis of the command from the controller B, with the result that the two pins 127, 128 are inserted into the holes 135a, 135b of the C-ring 135 having the free diameter on the paired receiving 116, 117, respectively, and at the same time the lower surfaces of the two hoods 125, 126 are abutted against the upper surface of the C-ring 135 (FIGS. 20A and 20B).

Then, when the air cylinder 121 of the finger means 107 is driven to extend the rod 121a in the Y direction, the inclined surfaces 123d, 124d of the levers 123, 124 are pushed by the three bearings 133. As a result, the paired levers 123, 124 are rotated in opposition to the spring force of the tension spring 138 to separate the inclined surfaces 123d, 124d away from each other, thus decreasing the distance between the pins 127, 128. Consequently, the diameter of the C-ring 135 is reduced, thus charging the C-ring, and the C-ring is supported by the two pins 127, 128 by its own repelling force.

Figure 21:
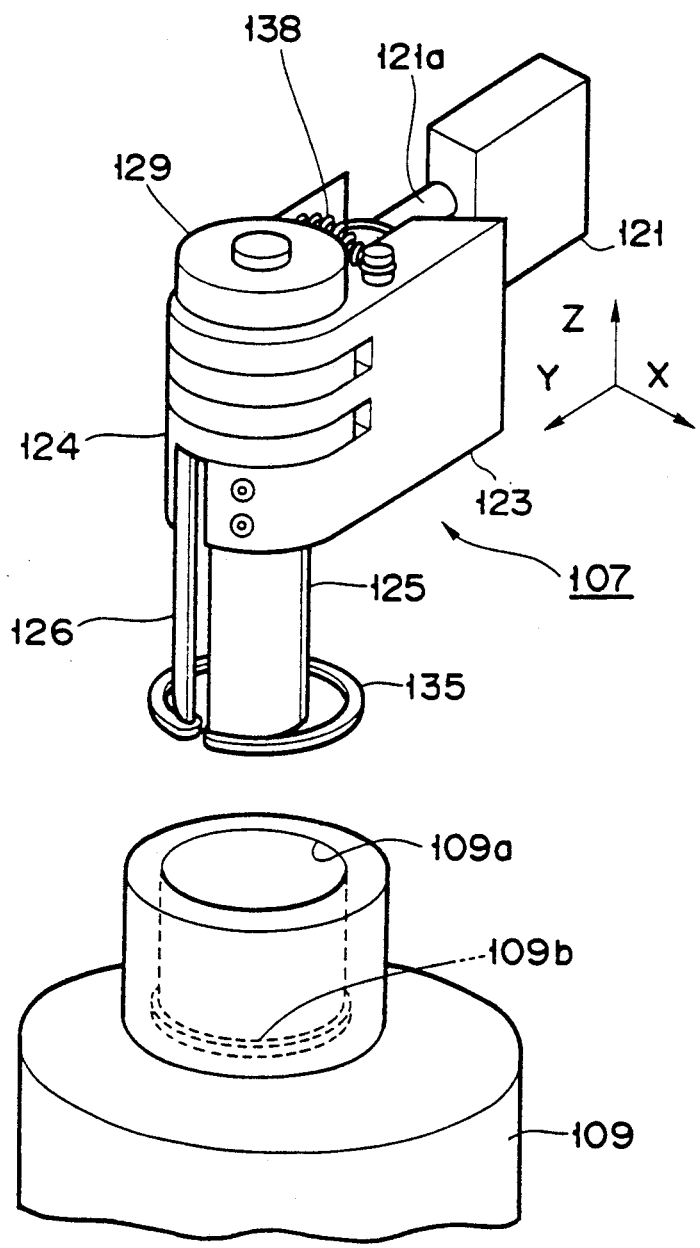
FIG. 21 is a perspective view of the finger means and the work, showing an intermediate part process of the ring mounting method.
Figure 22:
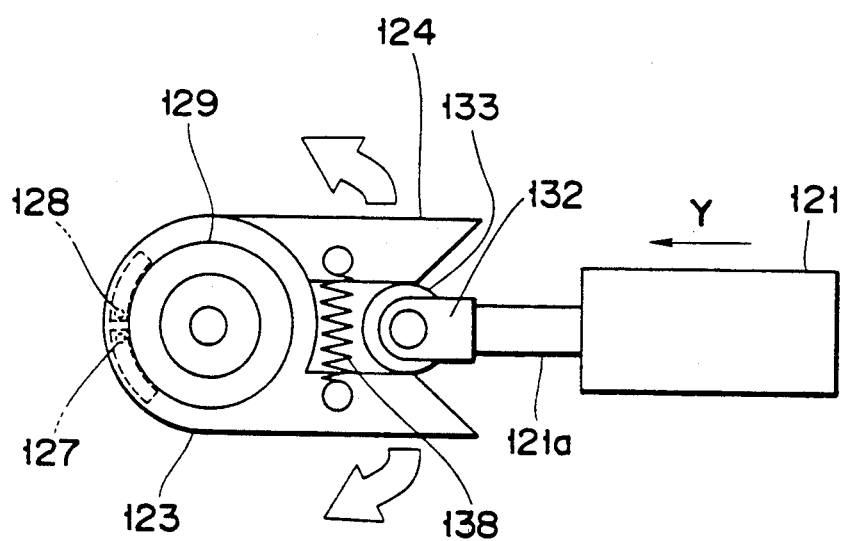
FIG. 22 is a plan view of the finger means of FIG. 21.
Figure 23A:
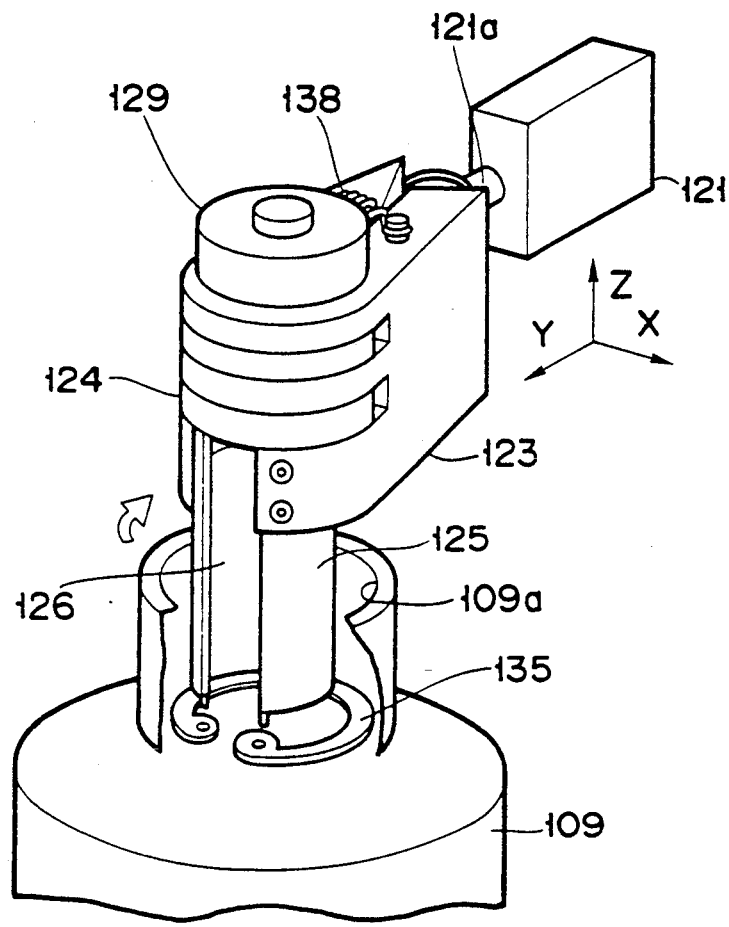
FIG. 23A is a perspective view of the finger means and the work.
Figure 23B:
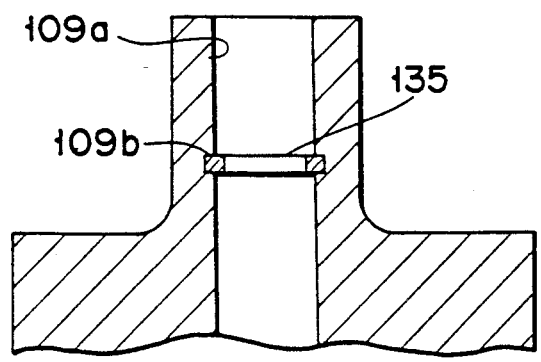
FIG. 23B is a sectional view of the work of FIG. 23A.

The Cartesian coordinates robot A shifts the finger means 107 in the triaxial directions by the second position shifting amount, with the result that the C-ring 135 charged and held by the pins 127, 128 is positioned directly above the insertion opening 109a of the work 109 (i.e., insertion position) (FIGS. 21 and 22). Then, by shifting the finger means 107 downwardly by the third position shifting amount, the C-ring 135 and the paired hoods 125, 126 are inserted into the insertion opening 109a of the work 109, whereby the C-ring 135 is positioned in the C-ring receiving groove 109b. Then, when the rod 121a of the air cylinder 121 is retracted, the paired levers 123, 124 are rotated by the spring force of the tension spring 138 so that the inclined surfaces 123d, 124d (FIG. 18) approach to each other, with the result that the distance between the pins 127, 128 is increased and the diameter of C-ring 135 is increased by its repelling force, whereby the C-ring is fitted in the C-ring receiving groove 109b (refer to FIGS. 23A and 23B). Thereafter, the finger means 107 is returned to the original position by the Cartesian coordinates robot A, and, then the work is replaced by a new one, and, thereafter, the above-mentioned operation or sequence is automatically repeated In this way, the C-rings for holes can be mounted on the works successively.

When the positions of the separating means 114 and the work 109 are changed, and/or when the kind of the work 109 is changed, the first, second and third position shifting amounts are adjusted or only third position shifting amount is adjusted accordingly, and a new program wherein the adjusted position shifting amounts are set may be inputted to the controller B.

Next, a modification for the seventh embodiment will be explained, with regard to only the different elements from the seventh embodiment.

Figure 24:
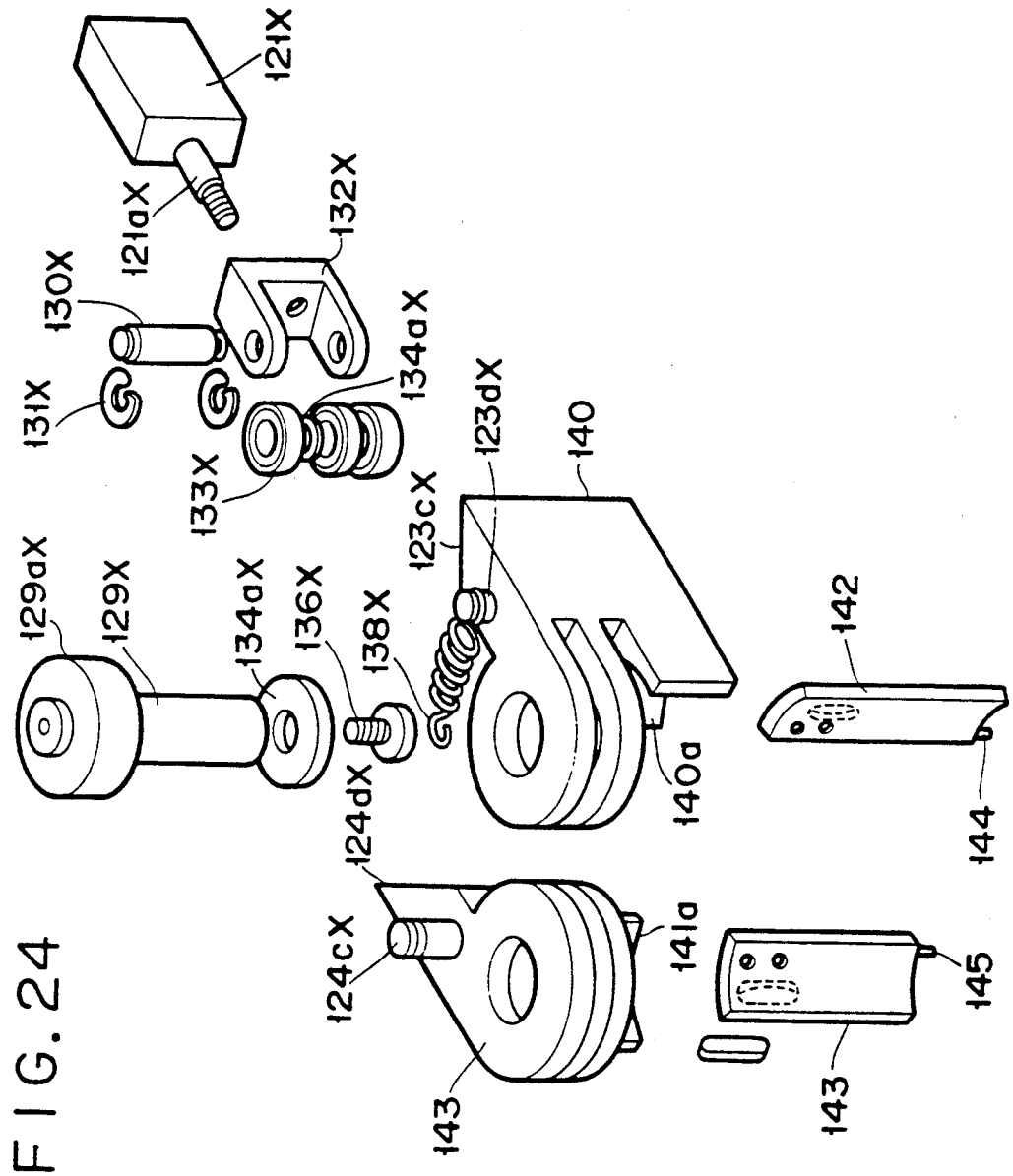
FIG. 24 is an exploded perspective view of a finger means of an elastic ring mounting apparatus according to a first modification of the embodiment of FIG. 14.
Figure 25A:
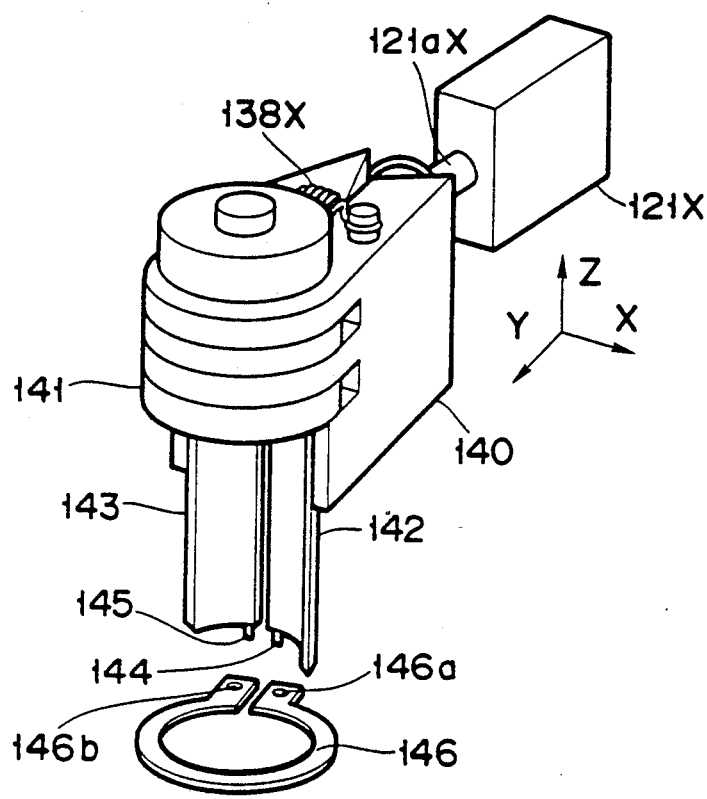
FIG. 25A is a perspective view of the finger means.
Figure 26:
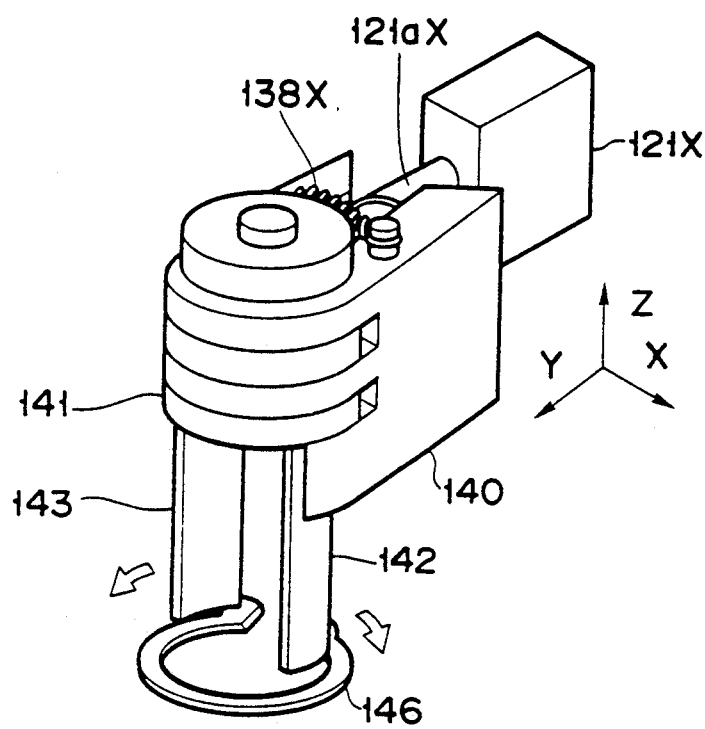
FIG. 26 is a perspective view of the finger means and the work, showing an intermediate part process of the ring mounting method.
Figure 26:
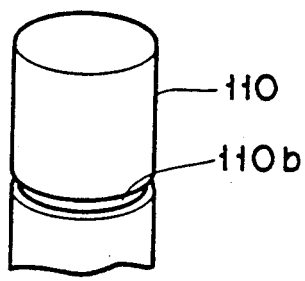

As shown in FIG. 24, the mounting apparatus according to this modification serves to mount a C-ring for shaft onto a shaft member (work). Lowermost portions of levers 140, 141 are disposed more inwardly in comparison with the seventh embodiment, and are provided with notches 140a, 141a, respectively. Hoods 142, 143 having pins 144, 145, respectively, are rigidly secured in the corresponding notches 140a, 141a by means of screws and keys. Each hood 142, 143 comprises an arcuated plate having a radius of curvature greater than the outer diameter of the work 110 (FIG. 26) so that it can enclose the work 110. Further, a distance between the pins 144, 145 equals a distance between the holes 146a, 146b of the C-ring 146 (FIG. 25A) having a free diameter (i.e., having a natural posture). In this condition, when the two pins 144, 145 are inserted into the holes 146a, 146b and an air cylinder 121X is driven to extend its rod 121aX, three bearings 133X are pressed against inclined surfaces 123cX, 124dX of the levers 140, 141, with the result that the paired levers 140, 141 are rotated in opposition to the spring force of a tension spring 138X in a direction that the inclined surfaces 123cX, 124dX are separated away from each other, thus increasing the distance between the pins 144, 145. Consequently, the diameter of the C-ring 146 is increased, thus charging the C-ring (FIG. 26). Other constructions of this modification are the same as those of the seventh embodiment, and, thus, the explanation thereof will be omitted.

Next, an operation of the apparatus according to this modification will be explained, with regard to only the differences from the seventh embodiment.

Figure 19B:
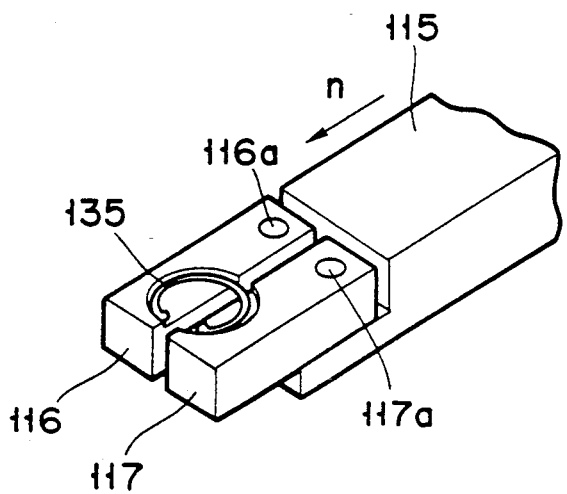
Figure 25B:
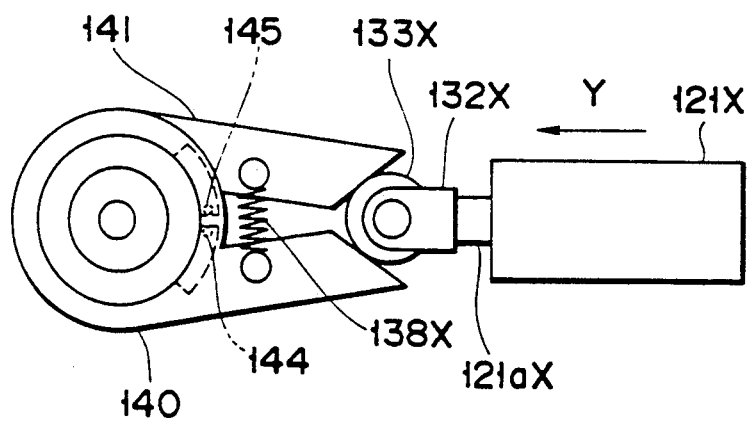
FIG. 25B is a plan view of the finger means of FIG. 25A.

The operation before the separating process shown in FIG. 19B is the same as that of the seventh embodiment. When the Cartesian coordinates robot A (FIG. 14) is operated, it shifts the finger means previously positioned at the original position to the triaxial directions by the first position shifting amount on the basis of the command from the controller B, with the result that the two pins 144, 145 are inserted into the holes 146a, 146b of the C-ring 146 having the free diameter on the paired receiving members 116, 117 (FIG. 16), respectively, and at the same time the lower surfaces of the two hoods 142, 143 are abutted against the upper surface of the C-ring 146 (FIGS. 25A and 25B).

Figure 27:
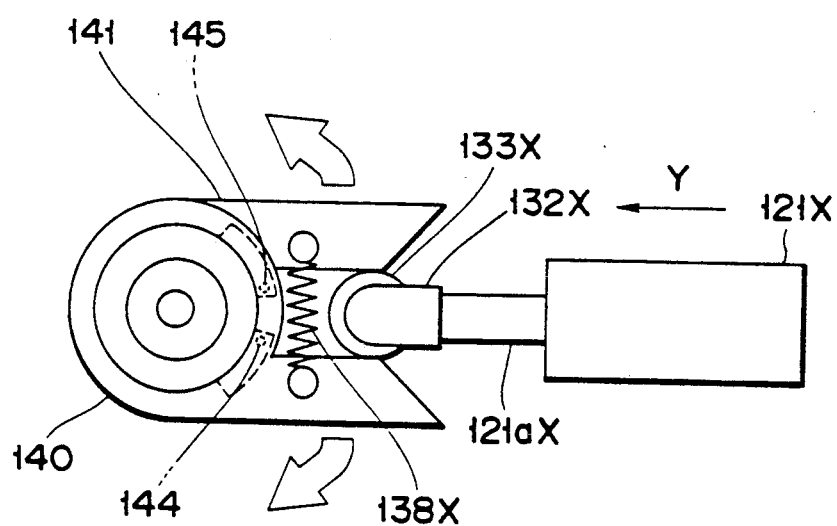
FIG. 27 is a plan view of the finger means of FIG. 26.
Figure 28:
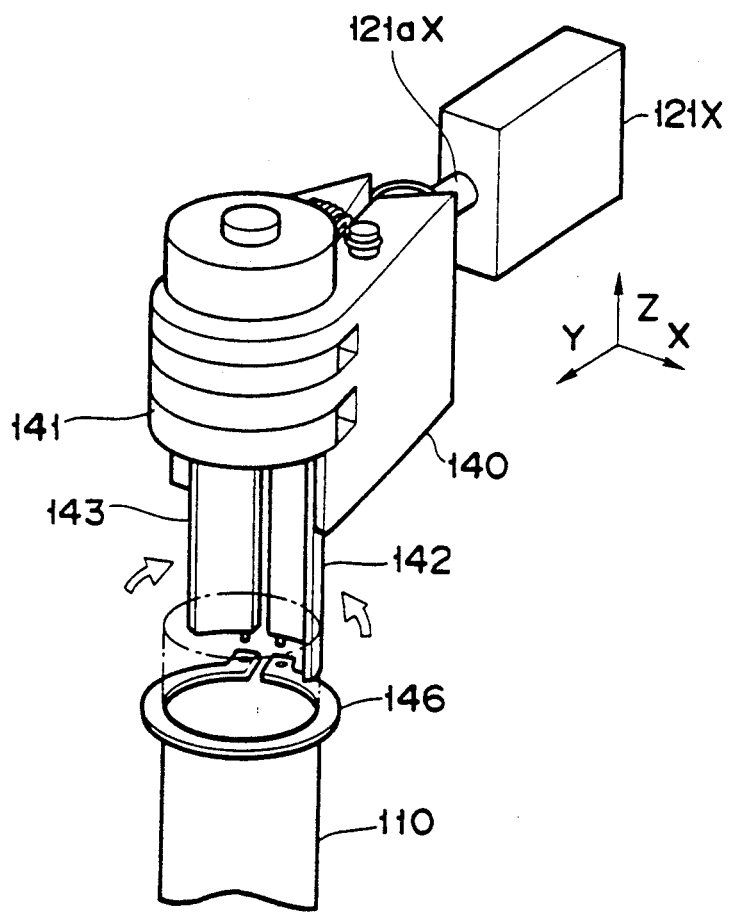
FIG. 28 is a perspective view of the finger means and the work, showing a rear part process of the ring mounting method.

Then, when the air cylinder 121X is driven to extend the rod 121aX, the inclined surfaces 123cX, 124dX (FIG. 24) of the levers 140, 141 are pushed by the three bearings 133X. As a result, the paired levers 140, 141 are rotated in opposition to the spring force of the tension spring 138X to separate the inclined surfaces 123cX, 124dX away from each other, thus increasing the distance between the pins 144, 145. Consequently, the diameter of the C-ring 146 is increased, thus charging the C-ring, and the C-ring is supported by the two pins 144, 145 by its own repelling force. The Cartesian coordinates robot A shifts the finger means in the triaxial directions by the second position shifting amount, with the result that the C-ring 146 charged and held by the pins 144, 145 is positioned directly above the shaft member (work) 110 rested on the base 101 (i.e., insertion position) (FIGS. 26 and 27). Then, by shifting the finger means downwardly by the third position shifting amount, the C-ring 146 is inserted on the work 110, whereby the C-ring 146 is positioned in a C-ring mounting groove 110b. Then, when the rod 121aX of the air cylinder 121X is retracted, the distance between the pins 144, 145 is decreased and the diameter of C-ring 146 is decreased by its repelling force, whereby the C-ring is fitted in the C-ring mounting recess 110b (refer to FIG. 28). Thereafter, the finger means is returned to the original position by the Cartesian coordinates robot A, and, then the work is replaced by a new one, and, thereafter, the above-mentioned operation or sequence is automatically repeated. In this way, the C-rings for shafts can be mounted on the works successively. Other operations of the apparatus according to this modification are the same as those of the seventh embodiment, and, thus, the explanation thereof will be omitted.

Next, a second modification for the seventh embodiment will be explained.

Figure 29:
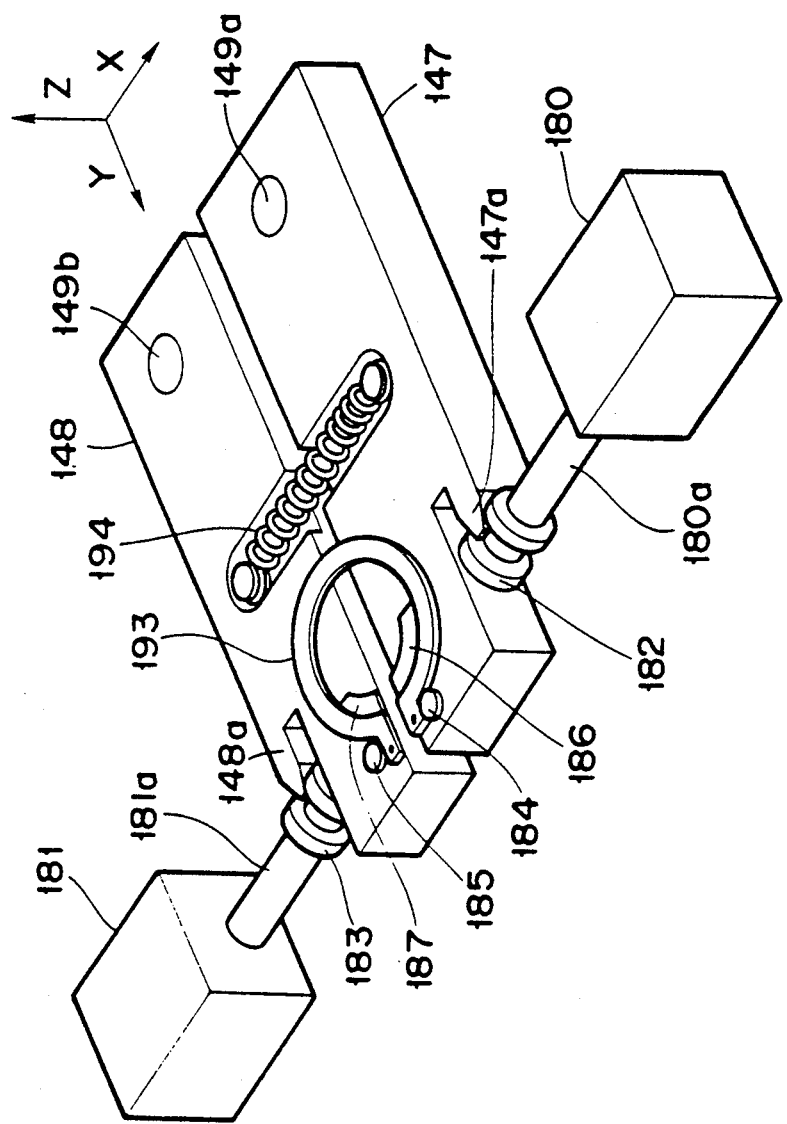
FIG. 29 is a perspective view of an elastic ring mounting apparatus according to a second modification, showing a condition that a pair of arms are closed.
Figure 30:
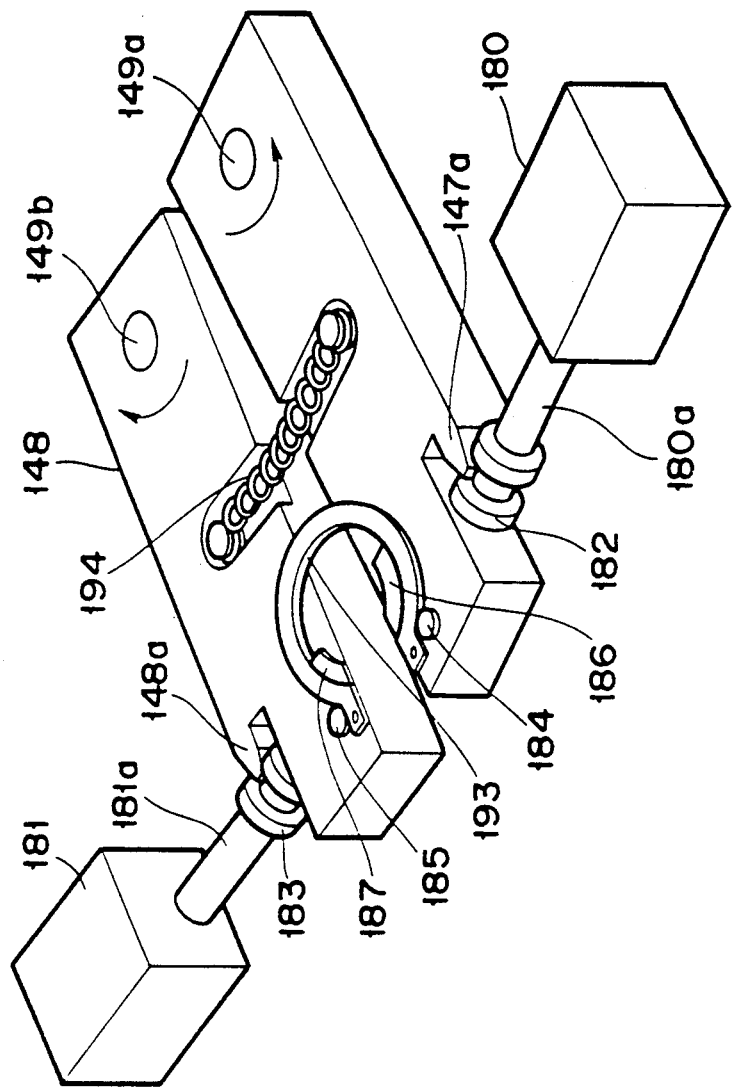
FIG. 30 is a view similar to FIG. 29, but showing a condition that the pair of arms are open.

As shown in FIGS. 29 and 30, a pair of opening/closing arms 147, 148 acting as receiving members are pivotally mounted, at their one ends, on an upper surface of a front part of the escape portion 115 (FIG. 15) so as to pivot round pins 149a, 149b, respectively. A compression spring 194 is disposed between the paired opening/closing arms 147, 148, thus always biasing the opening/closing arms 147, 148 toward an open position (FIG. 29). Upper surfaces of the opening/closing arms 147, 148 are flush with an upper surface of the escape portion 115. Cylindrical projections 184, 185 adapted to be engaged by outer peripheries of outer ends of a C-ring 193 (for shaft) having a free diameter are integrally formed on upper surfaces of the opening/closing arms 147, 148 at their front parts, respectively, and arcuated engagement pieces 186, 187 adapted to be engaged by inner peripheries of the outer ends of the C-ring 193 are also formed on the upper surface of the opening/closing arms 147, 148. With this arrangement, as the escape portion 115 is reciprocally shifted in the Y direction by means of the air cylinder (not shown), when the front portions of the arms 147, 148 are positioned below the C-rings stacked in the magazine 112 (FIG. 15), a lowermost C-ring is dropped down by its own weight to be rested on the paired arms 147, 148. Thereafter, by returning the escape portion 115 to the original position (FIG. 29), the C-ring 193 can be separated from the other C-rings. The separated C-ring 193 is locked by the pair of projections 184, 185 and engagement pieces 186, 187, so that the position of the C-ring is regulated.

On the other hand, air cylinders (charging means) 180, 181 having rods 180a, 181a, respectively, are fixed to the base 101 (FIG. 14). Substantially I-shaped engagement members 182, 183 are fixedly mounted on free ends of the rods 180a, 181a, respectively. When the paired opening/closing arms 147, 148 holding the C-ring 193 are returned to the original position together with the escape portion 115, the engagement members 182, 183 are engaged by locking portions 147a, 148a formed on the arms 147, 148, respectively. In this condition, when the air cylinders 180, 181 are driven synchronously with each other to retract the rods 180a, 181a, the paired opening/closing arms 147, 148 are slightly rotated to open around the respective pins 149a, 149b, with the result that the diameter of the C-ring 193 is increased by the engagement pieces 186, 187, thus charging the C-ring (FIG. 30). As apparent from the above explanation, the separating means 14 (FIG. 15) and the charging means constitute a separating charge means. Other constructions of this second alteration are the same as those of the aforementioned modification.

Next, an operation of the apparatus according to the second modification will be explained.

Figure 31:
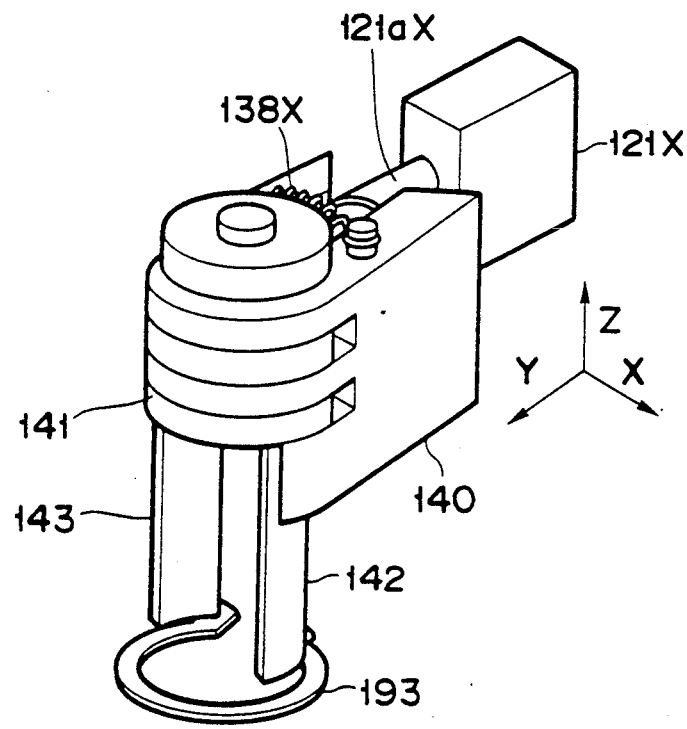
FIG. 31 is a perspective view of the finger means and the work, for explaining the ring mounting method.
Figure 31:
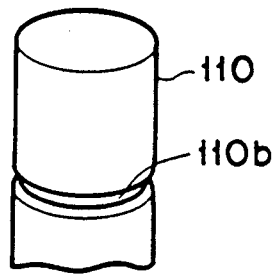
Figure 32:
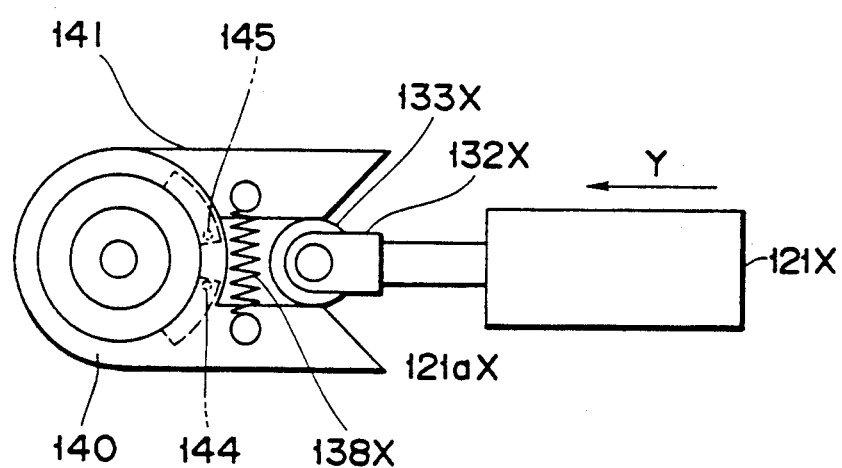
FIG. 32 is a plan view of the finger means of FIG. 31.

The operation before the separating process for separating one C-ring 193 shown in FIG. 29 is the same as that of the aforementioned modification and, thus, the explanation thereof will be omitted. As shown in FIG. 30, when the air cylinders 180, 181 are activated synchronously with each other to retract the rods 180a, 181a, the diameter of the C-ring 193 is increased, thus charging the C-ring. And, as shown in FIGS. 31 and 32, the air cylinder 121X of the finger means is driven to extend the rod 121aX, thereby rotating the levers 140, 141 to increase the distance between the pins 144, 145.

When the Cartesian coordinates robot A (FIG. 14) is operated, it shifts the finger means previously positioned at the original position to the triaxial directions by the first position shifting amount on the basis of the command from the controller B, with the result that the two pins 144, 145 are inserted into the two holes of the charged C-ring 193 on the paired opening/closing arms 147, 148, respectively, and at the same time the lower surfaces of the two hoods 142, 143 are abutted against the upper surface of the C-ring 193.

Then, the pressurized air is released from the air cylinders 180, 181 (FIG. 29) so that the rods 180a, 181a becomes a free condition. As a result, the paired opening/closing arms 147, 148 also become the free condition, with the result that the C-ring 193 is supported by the two pins 144, 145 by its own repelling force and the repelling force of the spring 194.

The Cartesian coordinates robot A shifts the finger means in the triaxial directions by the second position shifting amount, with the result that the C-ring 193 charged and held by the pins 144, 145 is positioned directly above the work 110 (i.e., insertion position). Then, by shifting the finger means downwardly by the third position shifting amount, the C-ring 193 is inserted on the work 110, whereby the C-ring 146 is positioned in the C-ring mounting groove 110b. Then, when the rod 121aX of the air cylinder 121X is retracted, the distance between the pins 144, 145 is decreased and the diameter of C-ring 193 is decreased by its repelling force, whereby the C-ring is fitted in the C-ring mounting groove 110b. Thereafter, the finger means is returned to the original position by the Cartesian coordinates robot A, and, then the work is replaced by a new one, and, thereafter, the above-mentioned operation or sequence is automatically repeated. In this way, the C-rings for shafts can be mounted on the works successively. In this modification, while an example that the paired opening/closing arms are both pivotally mounted on the escape portion was explained, the present invention is not limited to this example, but, only one of the opening/ closing arms may be pivotally mounted on the escape portion. In this case, the air cylinder for the other arm can be omitted, thus making the separating and supplying means more compact.

Next, a third modification of the seventh embodiment will be explained.

Figure 33:
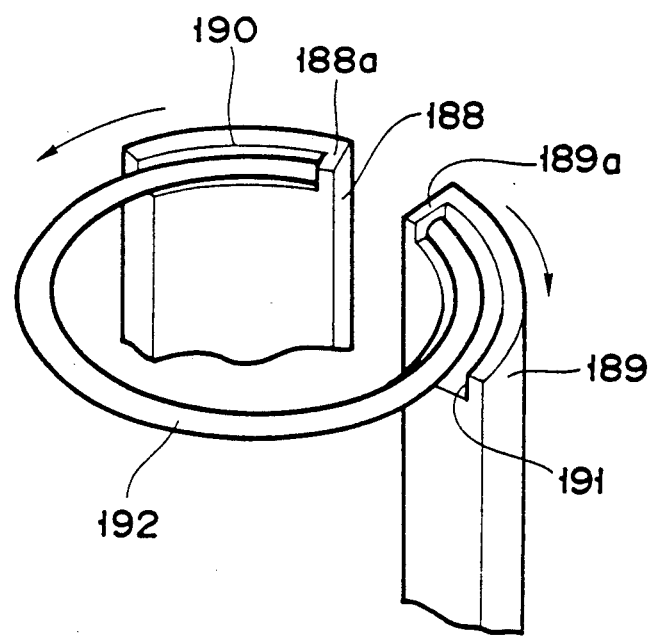
FIG. 33 is a partial perspective view of a finger means looked at from the underside, according to a third modification.

FIG. 33 is a perspective view of a finger means looked at from a lower side thereof. As shown in FIG. 33, the mounting apparatus according to this modification serves to mount a ring spring (as an elastic ring for shaft) 192 onto a work. Notches 190, 191 are formed in inner peripheral portions of lower ends of a pair of hoods 188, 189, and locking portions 188a, 189a are formed on the opposed lower ends of the hoods 188, 189. The portions 190, 191 can receive free end portions of the ring spring 192, respectively so that the free ends of the ring spring 192 are abutted against the locking portions 188a, 189a, respectively. Other constructions of this third modification are the same as those of the aforementioned modification and, thus, the explanation thereof will be omitted.

Next, an operation of the apparatus according to this third modification will be explained.

The operation before the separating process is the same as that of the first modification. When the Cartesian coordinates robot A (FIG. 14) is operated, it shifts the finger means previously positioned at the original position to the triaxial directions by the first position shifting amount on the basis of the command from the controller B, with the result that the free end portions of the separated ring spring 192 are received in the notches 190, 191 of the hoods 188, 189, respectively.

Then, when the air cylinder 121X (FIG. 24) is driven to extend the rod 121aX, the inclined surfaces 123cX, 124dX of the paired levers 140, 141 are pushed by the three bearings 133X. Consequently, the levers 140, 141 are rotated in opposition to the spring force of the tension spring 138X so that the inclined surfaces 123cX, 124dX is separated from each other, with the result that the hoods 188, 189 are rotated in the directions shown by the arrows to open. As a result, the diameter of the ring spring 192 is increased, thus charging the ring spring, and the ring spring is supported by the hoods 188, 189 by its own repelling force. The processes after this are the same as those of the first modification, and, thus, the explanation thereof will be omitted. In this modification, a ring spring having a rectangular section can be adopted as well as the ring spring having a circular section.

In the above-mentioned embodiments and modifications, constructionally, it is preferable that the air cylinders are driven by a single pressurized air circuit; but, the cylinders may be driven by respective pressurized air circuits. Further, in place of the air cylinders, hydraulic cylinders may be used. In addition, the feeding means is not limited to the Cartesian coordinates robot, but may comprise a biaxial robot.

Since the present invention is constructed as mentioned above, it provides the following advantages:

(1) It is easy to hold and charge the elastic ring by means of the finger means;

(2) Since the insertion portion can be inserted into the insertion opening of the work, even when a distance between the insertion opening of the work and the ring receiving recess is long, the elastic ring can be inserted in the ring receiving recess;

(3) Since the elastic ring is supported by the insertion portion when the elastic ring is shifted to the work to be positioned regarding the ring receiving groove, the posture of the elastic ring is maintained, thus preventing the elastic ring from being out of position and being dropped off; and (4) Since the elastic ring does not slidingly contact with the work when the elastic ring is inserted into the work, the friction force is not generated, thereby preventing the elastic ring from being out of position and the work from being damaged. Further, even when a large-sized elastic ring is mounted, it is not required to use a large-sized feeding means, thus preventing the apparatus from becoming bulky.

In addition, since the elastic ring for the shaft does not slidingly contact the shaft member as the work when the elastic ring is inserted onto the work, the work is prevented from being damaged. Furthermore, there is no need to use a capping device for capping or uncapping a cap to the above-mentioned work, thus simplifying the construction of the apparatus and facilitating the maintenance and/or inspection.

Next, another embodiment of a ring mounting condition inspecting apparatus will now be explained.

Figure 34:
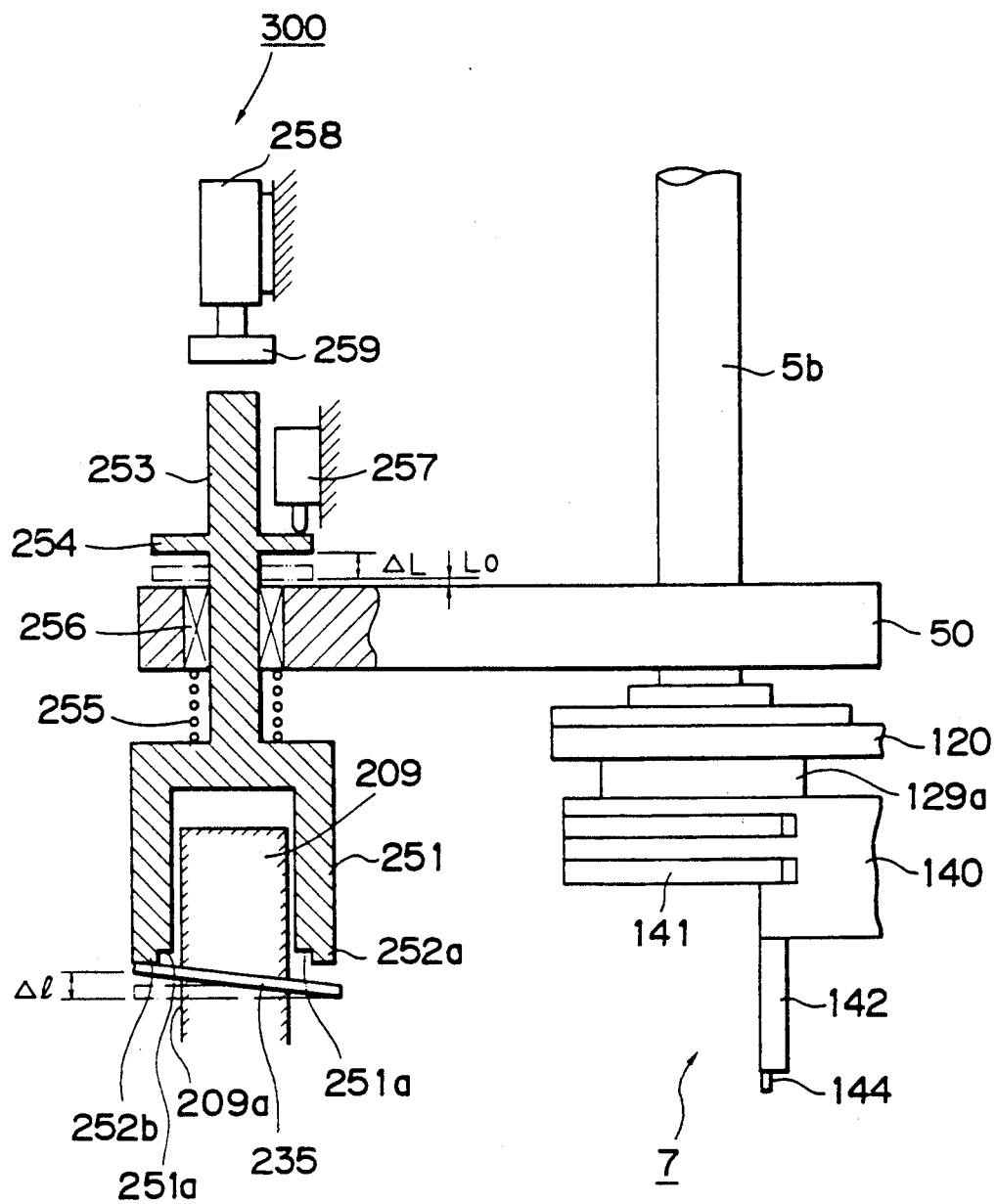
FIG. 34 is an explanatory view for explaining an inspecting method by means of a ring mounting condition inspecting apparatus according to a second embodiment.

FIG. 34 shows, in partial section, a C-ring mounting condition inspecting apparatus 300 for checking whether a C-ring is properly mounted by the mounting apparatus of FIG. 24. In the inspecting apparatus of FIG. 34, the control block diagram shown in FIG. 13 can be utilized.

The C-ring mounting condition inspecting apparatus 300 comprises a shaft 253 mounted on the base plate 50 via a sliding bearing 256; a cylindrical probe 251 having a bottom opening and connected at its central portion of an upper surface thereof to a lower end of the shaft 253; first and second contact pieces 252a, 252b having lower surfaces flush with each other and integrally formed on a lower surface 251a of the probe 251 in such a manner that these contact pieces are opposed to each other; a compression spring 255 encircling the shaft 253 and disposed between the probe 251 and the base plate 50, for biasing the probe 251 downwardly; a flange 254 formed on the shaft 253 at an opposite side from the probe 251 with respect to the base plate 50; a position detector 257 such as an electrical micrometer for detecting a height of the flange 254 from the base plate 50, attached to an inner surface of a case (not shown) in such a manner that a height of the detector from the base plate 50 becomes constant; a cylinder 258 attached to the inner surface of the case and having a rod 259 opposing to an upper surface of the shaft 253; and a cylinder driving device 280 (FIG. 13) for driving the cylinder 258.

As shown in FIG. 13, the cylinder driving device 280 includes an analogue/digital converting circuit (referred to as "A/D converting circuit" hereinafter) 81 for converting an analogue signal representative of a height of the flange 254 (i.e., height of the first and second contact pieces 252a, 252b) sent from the position detector 257 into a digital signal, a memory 82 in which a reference value $L_0$ for the height of the contact pieces is previously stored, a comparator 83 for obtaining a difference ΔL between the height of the contact pieces 252a, 252b (represented by the digital electrical signal inputted from the A/D converting circuit 81) and the reference value $L_0$ read from the memory 82 and for outputting an output electrical signal "0" when the difference ΔL falls within a predetermined range or outputting an output electrical signal "1" when the difference ΔL is out of the predetermined range, and a driving circuit 84 for driving the cylinder 258 when the output electrical signal from the comparator 83 is "1". Incidentally, an output electric signal is also sent to a controller B.

The controller B shown in FIG. 11 serves to control the activation of the aforementioned X-axis drive means, Y-axis drive means and motors 5a, 6a on the basis of an inputted program.

The controller B activates the Cartesian coordinates robot A in accordance with a program wherein the following five position shifting amounts are previously set:

(1) a first position shifting amount for shifting the finger means 7 from the original position to the separating means 14;

(2) a second position shifting amount for shifting the finger means 7 from the separating means 14 to the insertion position regarding the work 9;

(3) a third position shifting amount for shifting the finger means 7 from the insertion position regarding the work 9 to the C-ring receiving groove 9b;

(4) a fourth position shifting amount for shifting the C-ring mounting condition inspecting apparatus 300 to the insertion position regarding the work 9;

(5) a fifth position shifting amount for shifting the C-ring mounting condition inspecting apparatus 300 from the insertion position regarding the work 9 to the C-ring receiving groove.

In this case, since the controller B controls the activation of the X-axis drive means, Y-axis drive means and motors 5a, 6a of the Cartesian coordinates robot A, the finger means 7 and the C-ring mounting condition inspecting apparatus 300 are automatically shifted in accordance with the above five shifting amounts.

The Cartesian coordinates robot A shifts the C-ring mounting condition inspecting apparatus 300 together with the finger means 7 in the triaxial direction by the fourth position shifting amount, with the result that the probe 251 (FIG. 34) of the C-ring mounting condition inspecting apparatus 300 is positioned directly above the work (i.e., the insertion position). Thereafter, the controller B activates the motor 5a (FIG. 11) so that the C-ring mounting condition inspecting apparatus 300 is shifted downwardly together with the finger means 7 by the fifth position shifting amount, thereby shifting the probe 251 to the C-ring receiving recess 9a. In this case, since the probe 251 has the cylindrical configuration, it does not interfere with the shaft of the work 9.

Now, if the C-ring 235 is correctly fitted in the C-ring receiving groove 209b as shown by the broken line in FIG. 34, the probe 251 is stopped at a height condition wherein the first and second contact pieces 252a, 252b are both contacted with the C-ring 235 and the compression spring 255 is slightly compressed. In this condition, when the height of the flange 254 is detected by the position detector 257, such height will be substantially the same as the reference value $L_0$ stored in the memory 82 (FIG. 13). Accordingly, in this case, it is judged that the C-ring 235 is correctly fitted in the C-ring receiving groove 209b of the work 209, and thus, the controller B receives the output electrical signal "0" from the comparator 83 and controls the Cartesian coordinates robot A to return the finger means 7 to its original position. In this way, one cycle for the C-ring inserting operation is finished.

On the other hand, if the C-ring 235 is not correctly fitted in the C-ring receiving recess 209b of the work 209 as shown by the solid line in FIG. 34, the probe 251 and the shaft 253 are stopped when only the contact piece 252b is contacted with the C-ring 235, but, the base plate 50 is lowered by the fifth position shifting amount in opposition to the repelling force of the compression spring 255. As a result, after lowered, the distance between the flange 254 and the base plate 50 is increased. In this condition, when the height of the flange 254 is detected by the position detector 257, such height will be greater than the reference value $L_0$ stored in the memory 82 by Δ L. Accordingly, if the difference Δ L is out of a predetermined range, the comparator 83 emits the output electric signal "1", with the result that the cylinder 258 is driven by the driving circuit 84, thus lowering the shaft 253 by a predetermined amount by means of the rod 259. Consequently, the probe 251 is pushed down, with the result that a portion of the C-ring 235 contacting the second contact piece 252b is also pushed down, thereby fitting the C-ring 235 in the C-ring receiving groove 209a of the work 209 correctly. Thereafter, the controller B receives the output electric signal "0" from the comparator 83 and controls the Cartesian coordinates robot A to return the finger means 7 to its original position. In this way, one cycle for the C-ring inserting operation is finished.

Then, the work 9 is replaced by a new one, and, thereafter, the above-mentioned operation or sequence is repeated. In this way, the C-rings can be mounted on the works successively.

In the illustrated embodiment, while an example that two contact pieces (first contact piece 252a and second contact piece 252b) are formed in the cylindrical probe 251 of the C-ring mounting condition checking apparatus 300 was explained, three or more contact pieces may be formed on the probe with being equally spaced. However, in the case where the number of the contact pieces is increased, if the dirt and the like is adhered on the surface of the C-ring 235 mounted in the work 9, when the contact pieces are inserted into the work to check whether the C-ring is correctly mounted in the work, it is feared that erroneous detection occurs if any one of the contact pieces contacts with dirt on the surface of the C-ring. Therefore, the number of the contact pieces may be a few or several so that the percentage of the contact between the contact piece and the dirt is reduced.

According to the present invention, the following advantages can be obtained.

Since the engagement condition of the elastic ring for shaft is inspected by detecting the height of the probe when at least one of the contact pieces is contacted with the surface of the elastic ring for shaft, and by comparing the detected height with the predetermined height reference value, the engagement condition of the elastic ring can be inspected automatically. Further, since the probability of the contact between the contact piece and the dirt adhered to the surface of the elastic ring for the shaft can be reduced by providing several contact pieces on the probe with predetermined distances, the inspection of the elastic ring mounting condition can be effected accurately.

Further, since the probe can be further advanced along the shaft member when it was found that the elastic ring for the shaft was not correctly mounted by inspecting the elastic ring mounting condition, the elastic ring can be re-mounted in the ring receiving groove correctly.

In addition, since the mounting process and the inspecting process for the elastic ring for shaft can be continuously performed by inspecting the elastic ring mounting condition by means of the probe inserted onto the shaft member after the elastic ring has been mounted in the ring receiving groove by releasing the charging of the ring, the mounting and inspecting of the elastic ring can be effected swiftly.

Further, the present invention can provide an elastic ring mounting condition inspecting apparatus which can automatically and accurately inspect the engagement condition of the elastic ring for shaft.

Furthermore, the present invention can provide an elastic ring mounting condition inspecting apparatus which can correctly re-mount the elastic ring in the ring receiving groove when it was found that the elastic ring for shaft was not correctly mounted by inspecting the elastic ring engagement condition.

What is claimed is:

1. A method for inserting an elastic ring having a peripheral opening into a cylindrical workpiece at a predetermined position using a device comprising a two-part ring receiving member, with each part having an engaging portion for receiving and engaging the elastic ring, an actuator for operating the ring receiving member to reduce the diameter of the elastic ring positioned in the engaging portions, and a finger member for receiving the diametrally reduced elastic ring, said method comprising the steps of:
   supplying the elastic ring to the ring receiving member at a supplying position;
   engaging the elastic ring with the engaging portions;
   shifting the ring receiving member engaging the elastic ring to an operating position;
   reducing the diameter of the elastic ring by actuating the actuator to move the two parts of the ring receiving member in a reduction direction relatively toward each other;
   transferring the diametrally reduced elastic ring from the ring receiving member to the finger member;
   holding the diametrally reduced elastic ring with the finger member and inserting the ring into the cylindrical workpiece while maintaining the diametrally reduced state; and
   releasing the elastic ring from the diametrally reduced state at a predetermined position of the cylindrical workpiece to allow the elastic ring in the cylindrical workpiece to naturally expand.

2. A method according to claim 1, further comprising the step of prohibiting shifting of the elastic ring in the circumferential direction after the elastic ring is diametrally reduced by the ring receiving member.

3. A method according to claim 1, further comprising the step of positioning the elastic ring so as to match the peripheral opening with a divided position of the ring receiving member when the elastic ring is engaged with the ring receiving member,
   with each end of the elastic ring adjacent to the peripheral opening being engaged by a respective engaging portion of the ring receiving member, and wherein
   the elastic ring is diametrally reduced by actuating the ring receiving member and closing the peripheral opening.

4. A method for inserting an elastic ring having a peripheral opening and opposite ends each having a hole therein into a workpiece using a device comprising a two-part ring receiving member, with each part having a ring engaging portion for receiving and engaging the elastic ring, an actuator for operating the ring receiving member to reduce the diameter of the elastic ring positioned in the engaging portions, and a finger member for receiving the diametrally reduced elastic ring, comprising the steps of:
   moving the ring receiving member to an elastic ring supplying position;
   receiving the elastic ring in the ring engaging portions;
   actuating the actuator to move the ring engaging portions relatively toward each other so as to close the peripheral opening and reduce the diameter of the elastic ring;
   transferring the diametrally reduced elastic ring from the ring receiving member to the finger member;
   holding the elastic ring in a diametrally reduced state with the finger member and inserting the ring into the workpiece; and
   releasing the elastic ring at a predetermined position of the workpiece to allow the elastic ring to naturally expand.

5. A method for engaging an elastic ring having a peripheral opening with a workpiece using a device comprising a two-part ring receiving member, with each part having an engaging portion for receiving and engaging an elastic ring, an actuator for operating the ring receiving member to alter the diameter of an elastic ring positioned in the engaging portions, and a finger member for receiving a diametrally altered elastic ring, said method comprising the steps of:
   supplying an elastic ring to a supplying position;
   engaging the elastic ring in the ring engaging portions at the supplying position;
   actuating the actuator to move the ring engaging portions to alter the diameter of the elastic ring;
   transferring the diametrally altered elastic ring from the ring receiving member to the finger member;
   holding the elastic ring in a biased state with the finger member;
   aligning the elastic ring with the workpiece while maintaining the diameter of the ring in a biased state; and
   releasing the elastic ring from the diametrally biased state at a predetermined position of the member to engage the elastic ring therewith.

* * * * *

UNITED STATES PATENT AND TRADEMARK OFFICE
CERTIFICATE OF CORRECTION

PATENT NO. : 5,315,746  
DATED : May 31, 1994  
INVENTOR(S) : Machino et al.

Page 1 of 2

It is certified that error appears in the above-indentified patent and that said Letters Patent is hereby corrected as shown below: On title page, item

[56] REFERENCES CITED:

FOREIGN PATENT DOCUMENTS
"211228  7/1984  Fed. Rep. of Germany
 218294  2/1985  Fed. Rep. of Germany
 218581  2/1985  Fed. Rep. of Germany" should read
--211228  7/1984  Dem. Rep. of Germany
  218294  2/1985  Dem. Rep. of Germany
  218581  2/1985  Dem. Rep. of Germany--.

COLUMN 5:

Line 47, "$\lambda_2$" should read --$\ell_2$--.
Line 51, "$\lambda_2$" should read --$\ell_2$--.

COLUMN 8:

Line 29, "$\lambda_4$" should read --$\ell_4$--.
Line 31, "$\lambda_3$" should read --$\ell_3$--.

COLUMN 12:

Line 6, "$\lambda_0$" should read --$\ell_0$--.
Line 10, "$\lambda_0$" should read --$\ell_0$--.

UNITED STATES PATENT AND TRADEMARK OFFICE
CERTIFICATE OF CORRECTION

PATENT NO. : 5,315,746
DATED : May 31, 1994
INVENTOR(S) : Machino et al.

It is certified that error appears in the above-indentified patent and that said Letters Patent is hereby corrected as shown below:

COLUMN 13:

Line 9, "$\lambda_0$" should read --$\ell_0$--.
Line 28, "$\lambda_0$ by $\Delta\lambda$." should read --$\ell_0$ by $\Delta\ell$."
Line 29, "$\Delta\lambda$" should read --$\Delta\ell$--.
Line 30, "$\lambda_0$" should read --$\ell_0$--.

Signed and Sealed this

Twenty-ninth Day of November, 1994

Attest:

BRUCE LEHMAN

Attesting Officer    Commissioner of Patents and Trademarks